United States Patent
Komarevtsev et al.

(10) Patent No.: US 11,295,358 B1
(45) Date of Patent: Apr. 5, 2022

(54) SYSTEMS AND METHODS FOR GENERATING AND PRESENTING AN ELECTRONIC BILL IN A BILL TIMELINE VIEW

(71) Applicant: NetCracker Technology Corp., Waltham, MA (US)

(72) Inventors: Anton Komarevtsev, Vancouver (CA); Denis Ptushkin, Waltham, MA (US); Aviel Gootman, Vancouver (CA)

(73) Assignee: NETCRACKER TECHNOLOGY CORP., Waltham, MA (US)

( * ) Notice: Subject to any disclaimer, the term of this patent is extended or adjusted under 35 U.S.C. 154(b) by 29 days.

(21) Appl. No.: 14/645,582

(22) Filed: Mar. 12, 2015

Related U.S. Application Data

(60) Provisional application No. 62/036,846, filed on Aug. 13, 2014.

(51) Int. Cl.
 *G06Q 30/04* (2012.01)
 *G06F 3/0484* (2013.01)
 (Continued)

(52) U.S. Cl.
 CPC ........... *G06Q 30/04* (2013.01); *G06F 3/0484* (2013.01); *G06F 3/04886* (2013.01)

(58) Field of Classification Search
 CPC .................................................. G06Q 30/04
 See application file for complete search history.

(56) References Cited

U.S. PATENT DOCUMENTS

| | | | |
|---|---|---|---|
| 6,804,337 B1 * | 10/2004 | Anderson | H04M 15/00 379/114.01 |
| 7,450,928 B1 | 11/2008 | Henry et al. | |

(Continued)

FOREIGN PATENT DOCUMENTS

| | | |
|---|---|---|
| EP | 2 953 333 A1 | 12/2015 |
| WO | WO-01/58199 A1 | 8/2001 |

(Continued)

OTHER PUBLICATIONS

Peltier, "Variable Width Column Charts", 2013, https://peltiertech.com/variable-width-column-charts/#comment-306352 (Year: 2013).*

(Continued)

*Primary Examiner* — Allen C Chein
(74) *Attorney, Agent, or Firm* — Foley & Lardner LLP

(57) ABSTRACT

A method for generating and presenting bills in a bill timeline is described. A bill generation system receives a request to generate a bill timeline including bill related information for a plurality of bills corresponding to a plurality of billing periods. The system determines, from the request, a charge type of each of the charges included in the request and a length of time associated with the charge. The system generates a plurality of visual content items, each of which corresponds to a respective charge of the plurality of charges. The system generates the bill timeline including a plurality of segments, each corresponding to a respective billing period. The system inserts, in the generated bill timeline, the generated visual content items in respective locations within the bill timeline according to a content insertion policy. The system displays, on a computing device, the bill timeline including the generated visual content items.

11 Claims, 35 Drawing Sheets

(51) Int. Cl.
  *G06F 3/0488*   (2013.01)
  *G06F 3/04886*  (2022.01)

(56) References Cited

U.S. PATENT DOCUMENTS

| | | | |
|---|---|---|---|
| 8,630,613 B2 | 1/2014 | Lisi et al. | |
| 8,660,521 B1 | 2/2014 | Daniel et al. | |
| 8,799,092 B2 | 8/2014 | Valdes et al. | |
| 9,225,847 B2 | 12/2015 | Daymond et al. | |
| 2002/0010666 A1* | 1/2002 | Wright | G06Q 20/10 705/34 |
| 2004/0138970 A1* | 7/2004 | Ramachandran | H04L 12/14 705/34 |
| 2004/0193512 A1* | 9/2004 | Gobin | G06F 17/30893 705/29 |
| 2005/0021458 A1 | 1/2005 | Rowe | |
| 2008/0319926 A1* | 12/2008 | Alam | G06Q 30/0283 705/400 |
| 2009/0055299 A1* | 2/2009 | King | G06Q 30/04 705/34 |
| 2010/0075630 A1 | 3/2010 | Tillitt et al. | |
| 2010/0121660 A1* | 5/2010 | Boykin | G06Q 10/02 705/5 |
| 2011/0010461 A1 | 1/2011 | Lassila et al. | |
| 2012/0246042 A1* | 9/2012 | Littrell | G06Q 50/06 705/34 |
| 2013/0124376 A1* | 5/2013 | Lefebvre | G06Q 20/102 705/34 |
| 2013/0159385 A1 | 6/2013 | Ocher et al. | |
| 2014/0038545 A1 | 2/2014 | Ramprasad et al. | |
| 2014/0040975 A1 | 2/2014 | Raleigh et al. | |
| 2014/0372269 A1* | 12/2014 | Ternan | G06Q 40/00 705/35 |
| 2015/0341503 A1 | 11/2015 | Chandramouli et al. | |

FOREIGN PATENT DOCUMENTS

| | | | |
|---|---|---|---|
| WO | WO-2007/120117 A2 | 10/2007 | |
| WO | WO-2013/168093 A2 | 11/2013 | |

OTHER PUBLICATIONS

Ranjit, "Create interactive charts and implement drill-down—using Sencha Touch Pie chart and Bar Chart", 2013, https://wtcindia.wordpress.com/2013/05/20/create-interactive-charts-and-implement-drill-down-using-sencha-touch-pie-chart-and-bar-chart/ (Year: 2013).*

West Linn, Jan. 2014, available at https://westlinnoregon.gov/sites/default/files/fileattachments/finance/page/6331/city_services_bill_and_comparison_graphs_jan_2014.pdf, (Year: 2014).*

West Linn, Jan. 2014, available at https://westlinnoregon.gov/sites/default/files/fileattachments/finance/page/6331/city_services_bill_and_comparison_graphs_jan_2014.pdf, (Year: 2014) (Year: 2014).*

PGE, Aug. 2013, https://www.pge.com/en_US/residential/your-account/your-bill/understand-your-bill/bill-inserts/2013/august/archive-august-2013-bill-inserts.page (Year: 2013).*

"Time-of-Use Rates for Business: Frequently Asked Questions", 2013, available at https://www.ci.brea.ca.us/DocumentCenter/View/1101/TOU_FAQs_5_10_2013?bidId= (Year: 2013).*

Sklar Mar. 2011, available at https://www.researchgate.net/figure/Gantt-chart-showing-time-sequence-of-measurements-for-each-magnet-site-Thickness-of-each_fig9_222062781 (Year: 2011).*

Peltier, 2009, https://peltiertech.com/variable-width-column-charts/ (Year: 2009).*

Non-Final Office Action dated Nov. 16, 2018 in co-pending U.S. Appl. No. 15/395,320 (14 pgs.).

Non-Final Office Action dated Oct. 5, 2018 in co-pending U.S. Appl. No. 15/395,295 (11 pgs.).

Final Office Action on U.S. Appl. No. 15/395,295 dated May 15, 2019 (including US Publication Nos. 2009/0081989-A1 and 2014/0279438-A1 as mentioned therein).

Non-Final Office Action on U.S. Appl. No. 15/395,320 dated Feb. 5, 2020.

Notice of Allowance on U.S. Appl. No. 15/395,295 dated Sep. 9, 2019.

* cited by examiner

Fig. 4A

| Overview | Bills and Payments | Wireless | IPTV | Internet | VoIP | My Account |

View Simple Bill | View Bill Timeline | Billing History | Payment History | Usage History Help | Logout   Search 🔍

Bill Timeline Chart

| Nov 5 – Dec 4 | Dec 5 – Jan 4 | Jan 5 – Feb 2 | Feb 3 – Mar 4 |
|---|---|---|---|
| $90.65 previous | $140.70 current | $41.50 estimate | $41.50 estimate |

Device Protection Plan
International Call
Device Upgrade
Wireless Unlimited Plan
500 National Minutes Plan
Movie Pack
Movie Plan
Friends Plan
IPTV (Base Subscription)

Nov 5 — Dec 5 — Dec 15 — Jan 1 — Jan 5 — Feb 3

Fig. 4F

| Overview | Bills and Payments | Wireless | IPTV | Internet | VoIP | My Account |

View Simple Bill | View Bill Timeline | Billing History | Payment History | Usage History

Bill Timeline

| Previous Bill $148.⁵⁷ | Current Bill $202.⁹⁴ | Next Month Estimate $91.⁸⁴ |
|---|---|---|
| Wireless $90.65 | Wireless $140.70 | Wireless $41.50 |
| Unlimited National Plan $40.00 | Unlimited National Plan (10 days) $12.20 | 500 National minutes plan $35.00 |
| | 500 National minutes plan (21 days) $22.00 | |
| International Calls $44.15 | | |
| | Device Upgrade $100.00 | |
| Device Protection Plan $6.50 | Device Protection Plan $6.50 | Device Protection Plan $6.50 |
| IPTV $42.00 | IPTV $40.50 | IPTV $40.50 |

Fig. 4G

| Overview | Bills and Payments | Wireless | IPTV | Internet | VoIP | My Account |

View Simple Bill | View Bill Timeline | Billing History | Payment History | Usage History Help | Logout  Search

Bill Timeline

| | Previous Bill | | Current Bill | | Next Month Estimate | |
|---|---|---|---|---|---|---|
| | | $90.65 | | $140.70 | | $41.50 |
| Wireless | | $40.00 | Wireless | | Wireless | |
| Unlimited ??? Plan | | | Unlimited ??? Plan (10 days) | $12.20 | 500 ??? minutes plan (21 days) | $35.00 |
| Friends Plan | | | 500 ??? minutes plan (21 days) | $22.00 | Device Assurance | $6.50 |
| Internet Calls | | $44.15 | Device Upgrade | $100.00 | | |
| Device Assurance | | $6.50 | Device Assurance | $6.50 | | |
| IPTV | | $42.00 | IPTV | $40.50 | IPTV | $40.50 |

Fig. 4H

| Overview | Bills and Payments | Wireless | IPTV | Internet | VoIP | My Account | | Help | Logout | Search 🔍 |

View Simple Bill | View Bill Timeline | Billing History | Payment History | Usage History Bill Timeline

| Previous Bill | $57 | Current Bill | $77 | Next Month Estimate | $82 |
|---|---|---|---|---|---|
| Optic TV Essentials | $15 | Optic TV Essentials | $15 | Optic TV Essentials | $15 |
|  |  | Additional STB Rental (16 days) | $8 | Additional STB Rental | $15 |
| Internet 15 | $30 | Internet 15 (10 days) | $10 | Internet 50 | $40 |
|  |  | Internet 50 (21 days) | $32 |  |  |
| Email | $0 | Email | $0 | Email | $0 |
| Home Phone Basic | $12 | Home Phone Basic | $12 | Home Phone Basic | $12 |

| Services | | | |
|---|---|---|---|
| Second STB Rental | $15/Month | $102.00 Pro-rated charge: $11.00 Monthly fee: $15.00 Installation: $25.00 | $127.00 | $115.00 |
| Optik TV: Essential | $15/Month | $15.00 | $15.00 | $15.00 |
| Basic Internet: 50/15 Mbps | $35/Month | $35.00 Pro-rated charge: $15.50 | | |
| Faster Internet 75/25 Mbps | $45/Month | Pro-rated charge: $24.70 Monthly fee: $45.00 | $45.00 | |
| Basic Phone (1 line) | $12/Month | $12.00 International Call: $6.53 Monthly fee: $12.00 | $0.00 | |
| Wireless Advanced | $65/Month | $65.00 | $65.00 | $65.00 |
| Wireless Unlimited Promo | -$20/Month | -$20.00 | -$20.00 | |
| Video on Demand | $3.99 per view | $3.99 $7.98 | | |

July 5, July 11, July 16, July 29, August 5, September 5, October 5,
2013    2013    2013    2013    2013        2013              2013

Current Bill
Payment due: August 20, 2013

Fig. 4N

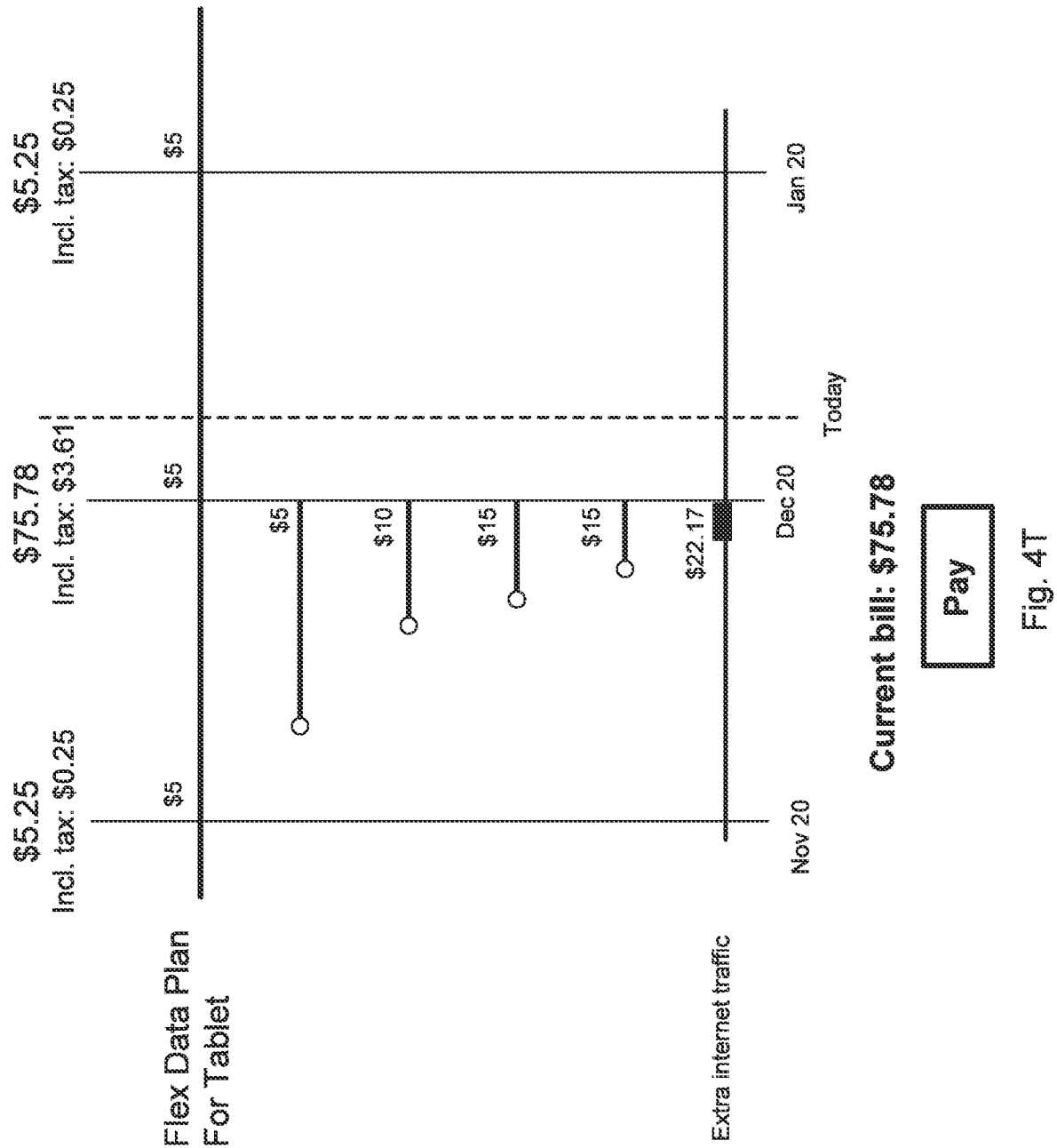

| Current Bill for December 26 | | Bill Estimate for January 26 | | Bill Estimate for February 26 | | Bill Estimate for March 26 | |
|---|---|---|---|---|---|---|---|
| Total | $85.12 | Total | $182.18 | Total | $114.56 | Total | $124.32 |
| Optik TV Essentials | $31.00 | Optik TV Essentials | $31.00 | Optik TV Essentials | $31.00 | Optik TV Essentials | $31.00 |
| Flex Data Plan for Tablets | $20.00 | Flex Data Plan for Tablets | $61.50 | Flex Data Plan for Tablets | $5.00 | Flex Data Plan for Tablets | $5.00 |
| Pro-rated charge | $5.00 | Pro-rated charge | $5.00 | | | | |
| Coverage | $15.00 | Overage | $56.50 | | | | |
| Internet 25 | $25.00 | Internet 25 | -$3.23 | | | | |
| | | Credit for January 22 - January 26 | | | | | |
| | | Internet 75 | $84.68 | Internet 75 | $75.00 | Internet 75 | $75.00 |
| | | January 22 - January 26 | $9.68 | | | | |
| | | January 27 - February 26 | $9.68 | | | | |
| | | Promotion | -$11.29 | Promotion | -$8.71 | | |
| | | January 22 - January 26 | -$1.29 | February 26 - March 22 | | | |
| | | January 27 - February 26 | -$10.00 | | | | |
| Taxes (Total) | $9.12 | Taxes (Total) | $19.52 | Taxes (Total) | $12.27 | Taxes (Total) | $13.32 |
| GST | $3.80 | GST | $8.13 | GST | $5.11 | GST | $5.55 |
| PST | $5.32 | PST | $11.39 | PST | $7.16 | PST | $7.77 |

SYSTEMS AND METHODS FOR
GENERATING AND PRESENTING AN
ELECTRONIC BILL IN A BILL TIMELINE
VIEW

RELATED APPLICATIONS

This application claims the benefit of and priority to U.S. Provisional Application 62/036,846, entitled "SYSTEMS AND METHODS FOR GENERATING AND PRESENTING AN ELECTRONIC BILL IN A BILL TIMELINE VIEW," filed on Aug. 13, 2014, which is incorporated herein by reference in its entirety for all purposes.

FIELD OF THE INVENTION

The present disclosure relates to systems and methods for generating and presenting electronic bills. In particular, the present disclosure relates to methods and systems for generating and presenting electronic bills in a bill timeline view.

BACKGROUND OF THE INVENTION

Service providers, such as telecommunications providers are constantly concerned with the customer satisfaction and user experience. One of the main complaints many customers have is caused to a failure to understand charges included in their periodic bills.

BRIEF SUMMARY OF THE INVENTION

The present solution disclosed herein is directed to methods and systems for generating and presenting bills in a bill timeline. According to one aspect, a method for generating and presenting bills in a bill timeline is described. A bill generation system including one or more processors can receive a request to generate a bill timeline including bill related information for a plurality of bills corresponding to a plurality of billing periods. The request can include charges assessed by a provider to include in the bill timeline. The bill generation system can determine, from the request, a charge type of each of the plurality of charges included in the request and a length of time associated with the charge. In some implementations, a charge type can include charges that are of the same type. The granularity of each charge type can be defined by the bill generation system. For instance, in some implementations, the bill generation system can provide disparate charge types for different product instances with their product charges and charge adjustments, one-time charges, event charges, payments, good will adjustments, each corresponding to different charge types. In some implementations, all charges that are periodic charges may be considered the same charge type, while all charges corresponding to one-time charges may be considered the same charge type. The bill generation system can generate a plurality of visual content items, each of which corresponds to a respective charge of the plurality of charges. Each visual content item of a respective charge type can have a set of visual characteristics that are different from visual characteristics of visual content items of another respective charge type. Moreover, each visual content item corresponding to a periodic charge can have a dimension that has a size that is based on a ratio of the length of time associated with the charge and a length of time associated with the billing period in which the charge was assessed. The bill generation system can generate the bill timeline including a plurality of segments. Each of the segments may correspond to a respective billing period. The bill generation system can insert, in the generated bill timeline, the generated visual content items in respective locations within the bill timeline according to a content insertion policy. The content insertion policy can include one or more rules to insert visual content items corresponding to charges of a particular charge type in the bill timeline such that the visual content items corresponding to charges of the particular charge type are aligned adjacent one another in a first dimension and visual content items corresponding to charges assessed in a particular billing period are aligned adjacent one another in a second dimension. The bill generation system can insert, in the generated bill timeline, at least one visual content item corresponding to a one-time charge assessed during a particular billing period within a portion of the bill timeline corresponding to the billing period. The bill generation system can then display, on a computing device, the bill timeline including the generated visual content items.

In some implementations, to insert, in the generated bill timeline, at least one visual content item corresponding to a one-time charge assessed during a particular billing period within a portion of the bill timeline corresponding to the billing period, the bill generation system can determine a date within the billing period on which the one-time charge was assessed or incurred and insert the visual content item corresponding to the one-time charge within a portion of the bill timeline corresponding to the date within the billing period.

In some implementations, to insert, in the generated bill timeline, the generated visual content items in respective locations within the bill timeline according to the content insertion policy, the bill generation system includes inserting visual content items of charges of a first charge type in respective portions of the bill timeline such that the visual content items of charges of the first charge type are aligned in a first row and inserting visual content items of charges of a second charge type in respective portions of the bill timeline such that the visual content items of charges of the second charge type are aligned in a second row adjacent the first row.

In some implementations, the generated bill timeline is interactive. In some implementations, the bill generation system can receive an online action on a visual content item inserted in the generated bill timeline and provide, for display, responsive to the receiving the online action, a supplemental content item including additional details of the charge associated with the visual content item on which the online action was received. In some implementations, the bill generation system can receive an online action and trigger showing or hiding visual content for billing periods, customer locations, products, charges or groups of charges.

In some implementations, the bill generation system can further generate visual content items corresponding to credits associated with the account for which the bill timeline is generated and provide, for display, the visual content items corresponding to the credits in a portion of the bill timeline corresponding to a billing period within which the credit was received or applied.

In some implementations, the bill generation system can further identify a plurality of charge types to group together, identify charges of the identified plurality of charge types, group together the charges of the identified plurality of charge types and generate a single visual content item corresponding to the identified charges grouped together. The bill generation system can then provide, for display, the generated signal visual content item in a portion of the bill timeline corresponding to a billing period in which the charges that were grouped together were assessed.

In some implementations, each visual content item that corresponds to a periodic charge includes a first dimension and a second dimension. The first dimension has a first dimension size based on the ratio of the length of time associated with the charge and a length of time associated with the billing period in which the charge was assessed. The second dimension has a second dimension size based on an amount of the charge. In some such implementations, the first dimension is one of a width, length or height of the visual content item and the second dimension is another of the width, length or height of the visual content item.

In some implementations, the bill generation system can compute an aggregate of all the charges corresponding to each of the one or more of the billing periods and provide, for display, a total amount for a bill corresponding to a particular billing period based on the aggregate of all the charges corresponding to the particular billing period. In some instances, there can be subtotals for all product instances in the same customer location (subtotal for an branch or a business customer), subtotals for all product instances of one subscriber (subtotal per person on a family or a business customer), or subtotals for all product instances of the same type (for example, subtotal for internet usage across all offices of a business customer). These subtotals may be included in the bill total, as described herein.

According to another aspect, a system for generating and presenting bills in a bill timeline, includes a bill generation system including a memory storing processor-executable instructions and a processor configured to execute the processor-executable instructions. The processor can be configured to receive a request to generate a bill timeline including bill related information for a plurality of bills corresponding to a plurality of billing periods. The request can include charges assessed by a provider to include in the bill timeline. The processor can determine, from the request, a charge type of each of the plurality of charges included in the request and a length of time associated with the charge. The processor can generate a plurality of visual content items, each of which corresponds to a respective charge of the plurality of charges. Each visual content item of a respective charge type can have a set of visual characteristics that are different from visual characteristics of visual content items of another respective charge type. Moreover, each visual content item corresponding to a periodic charge can have a dimension that has a size that is based on a ratio of the length of time associated with the charge and a length of time associated with the billing period in which the charge was assessed. The processor can generate the bill timeline including a plurality of segments. Each of the segments may correspond to a respective billing period. The processor can insert, in the generated bill timeline, the generated visual content items in respective locations within the bill timeline according to a content insertion policy. The content insertion policy can include one or more rules to insert visual content items corresponding to charges of a particular charge type in the bill timeline such that the visual content items corresponding to charges of the particular charge type are aligned adjacent one another in a first dimension and visual content items corresponding to charges assessed in a particular billing period are aligned adjacent one another in a second dimension. The processor can insert, in the generated bill timeline, at least one visual content item corresponding to a one-time charge assessed during a particular billing period within a portion of the bill timeline corresponding to the billing period. The processor can then display, on a computing device, the bill timeline including the generated visual content items.

According to another aspect, a computer-readable storage medium has instructions to generate and present bills in a bill timeline. The instructions comprise instructions executable by a processor. The processor can be configured to receive a request to generate a bill timeline including bill related information for a plurality of bills corresponding to a plurality of billing periods. The request can include charges assessed by a provider to include in the bill timeline. The processor can determine, from the request, a charge type of each of the plurality of charges included in the request and a length of time associated with the charge. The processor can generate a plurality of visual content items, each of which corresponds to a respective charge of the plurality of charges. Each visual content item of a respective charge type can have a set of visual characteristics that are different from visual characteristics of visual content items of another respective charge type. Moreover, each visual content item corresponding to a periodic charge can have a dimension that has a size that is based on a ratio of the length of time associated with the charge and a length of time associated with the billing period in which the charge was assessed. The processor can generate the bill timeline including a plurality of segments. Each of the segments may correspond to a respective billing period. The processor can insert, in the generated bill timeline, the generated visual content items in respective locations within the bill timeline according to a content insertion policy. The content insertion policy can include one or more rules to insert visual content items corresponding to charges of a particular charge type in the bill timeline such that the visual content items corresponding to charges of the particular charge type are aligned adjacent one another in a first dimension and visual content items corresponding to charges assessed in a particular billing period are aligned adjacent one another in a second dimension. The processor can insert, in the generated bill timeline, at least one visual content item corresponding to a one-time charge assessed during a particular billing period within a portion of the bill timeline corresponding to the billing period. The processor can then display, on a computing device, the bill timeline including the generated visual content items.

BRIEF DESCRIPTION OF THE FIGURES

The foregoing and other objects, aspects, features, and advantages of the disclosure will become more apparent and better understood by referring to the following description taken in conjunction with the accompanying drawings, in which.

Figure 1A:
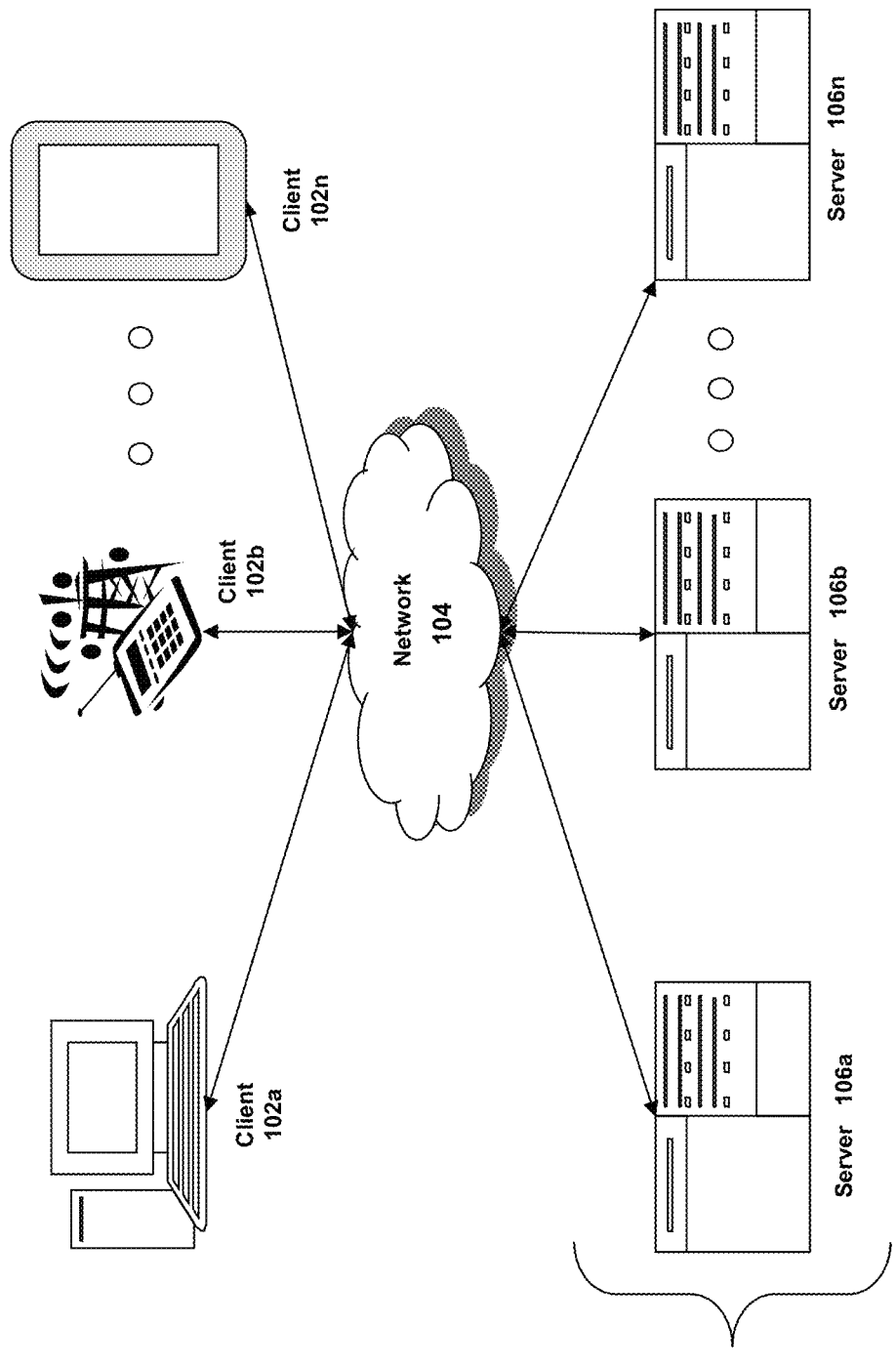
FIG. 1A is a block diagram depicting an embodiment of a network environment comprising local machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following enumeration of the sections of the specification and their respective contents may be helpful:

Section A describes a network and computing environment which may be useful for practicing embodiments described herein; and Section B describes embodiments of a bill generation system for generating and presenting bills in a bill timeline.

A. Network and Computing Environment

Prior to discussing the specifics of embodiments of the systems and methods, it may be helpful to discuss the network and computing environments in which such embodiments may be deployed, including a description of components and features suitable for use in the present systems and methods. FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can manage client/server connections, and in some cases can load balance client connections amongst a plurality of backend servers. The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS 7 or 8, manufactured by Microsoft Corp. of Redmond, Wash., UNIX, LINUX, or OS X.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; LTE, 3G; 4G; or any other protocol able to transmit data among mobile devices.

Figure 1B:
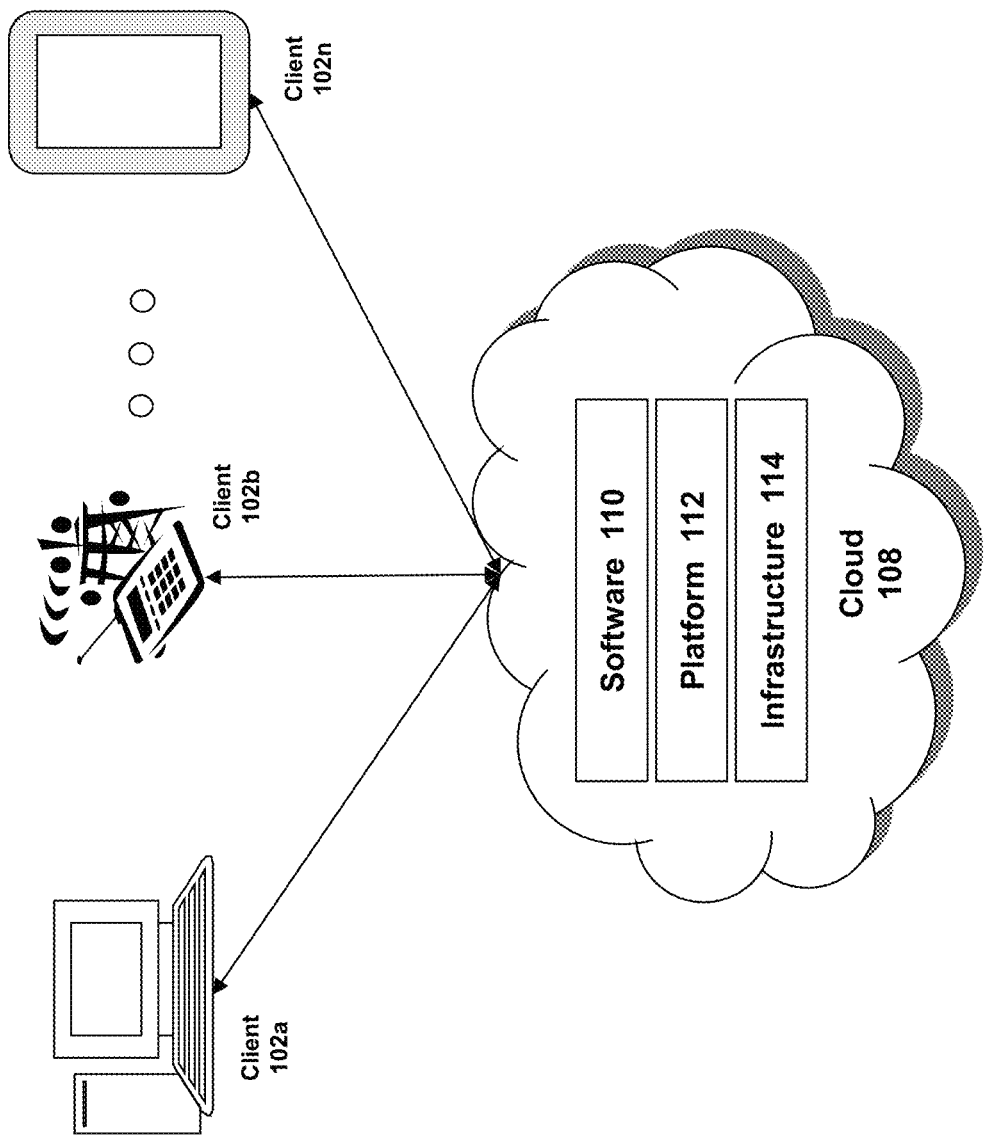
FIGS. 1B-1D are block diagrams depicting embodiments of computers useful in connection with the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a bill generation system (BGS) 120. The I/O controller 123, in some embodiments, is further connected to a key board 126, and a pointing device 127. Other embodiments may include an I/O controller 123 connected to more than one input/output device 130A-130N.

Figure 1C:
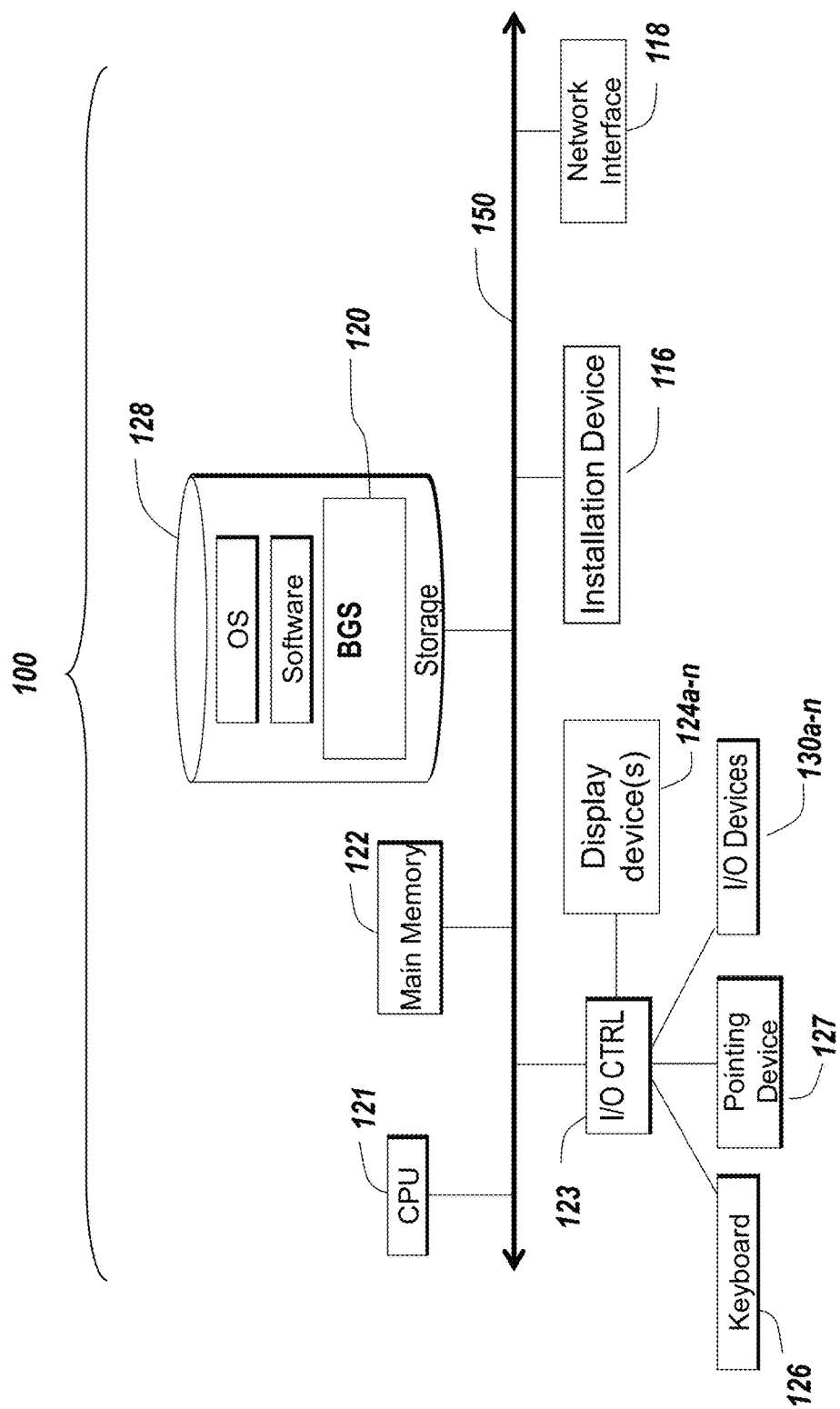
Figure 1D:
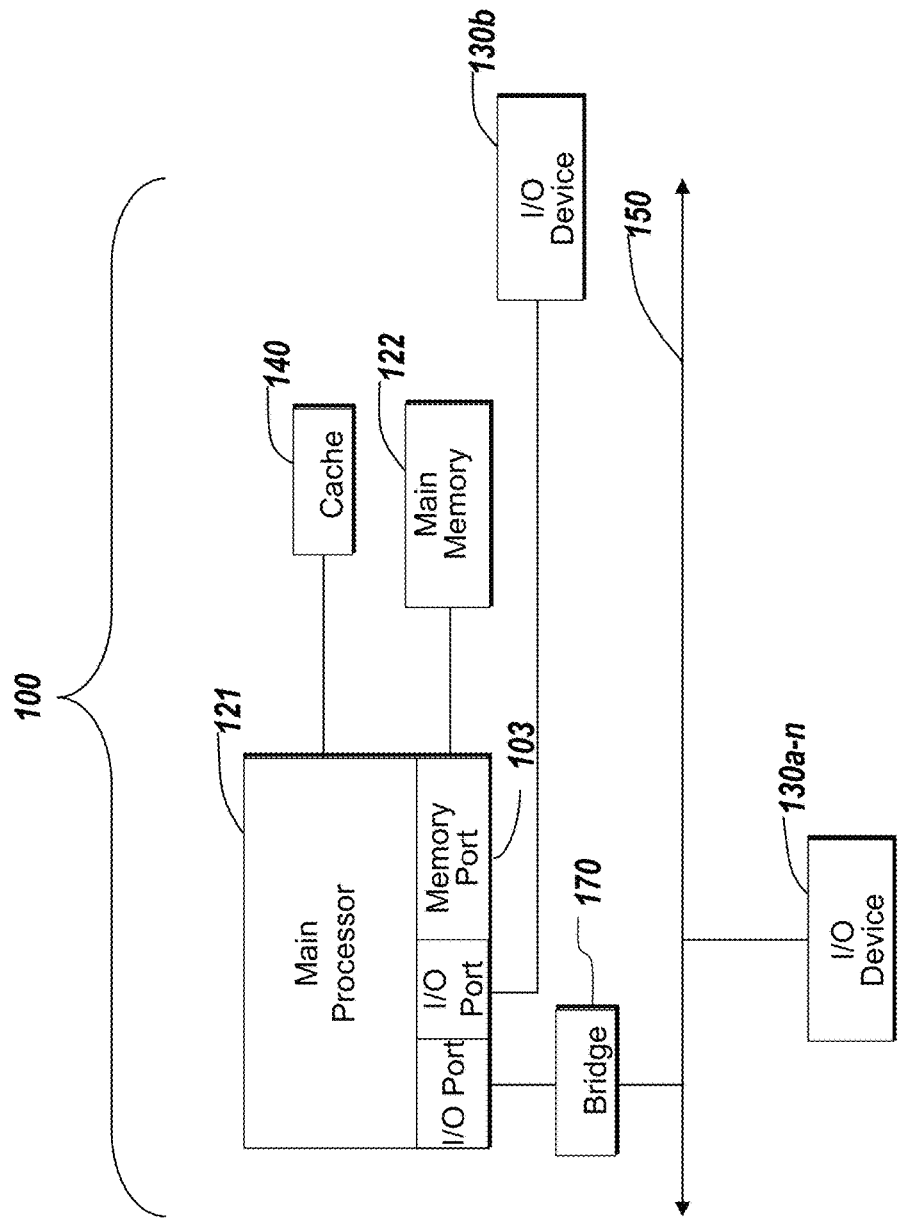

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include an image processor, a graphics processor or a graphics processing unit. The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can execute any operating system, while in other embodiments the computing machine 100 can execute any of the following operating systems: versions of the MICROSOFT WINDOWS operating systems; the different releases of the Unix and Linux operating systems; any version of the MAC OS manufactured by Apple Computer; OS/2, manufactured by International Business Machines; Android by Google; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook, a tablet; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA); any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; an Android phone; or any other handheld mobile device. Having described certain system components and features that may be suitable for use in the present systems and methods, further aspects are addressed below.

B. Generating and Presenting Bills in a Bill Timeline

Telecommunication service providers are constantly concerned with the customer satisfaction and user experience. One of the main issues that causes customer aggravation relates to billing, and in particular, when a customer experiences bill shock. Bill shock generally refers to the phenomenon that a customer may experience when the customer fails to understand the reason why the actual total amount on the bill is higher than expected. When a large number of customers experience bill shock, the volume of the calls to call centers grows and as a result, increases churn rates or cancellation rates. It has been determined that some of the main reasons for bill shock are proration, expiration of one or more promotions or excessive usage. Proration can be triggered by the first bill, a price plan change or a merging of billing accounts.

The present solution relates to improved methods and systems for generating and presenting bills. The methods and systems described herein can present a bill that allows a customer the ability to trace product charges, usage charges and one-time charges across multiple billing periods along a bill timeline. A bill generation system can include a memory and a processor. The processor can be configured to receive a request to generate a bill timeline including bill related information for a plurality of bills corresponding to a plurality of billing periods. The request can include charges assessed by a provider to include in the bill timeline. The processor can determine, from the request, a charge type of each of the plurality of charges included in the request and a length of time associated with the charge. The processor can generate a plurality of visual content items, each of which corresponds to a respective charge of the plurality of charges. Each visual content item of a respective charge type can have a set of visual characteristics that are different from visual characteristics of visual content items of another respective charge type. Moreover, each visual content item corresponding to a periodic charge can have a dimension that has a size that is based on a ratio of the length of time associated with the charge and a length of time associated with the billing period in which the charge was assessed. The processor can generate the bill timeline including a plurality of segments. Each of the segments may correspond to a respective billing period. The processor can insert, in the generated bill timeline, the generated visual content items in respective locations within the bill timeline according to a content insertion policy. The content insertion policy can include one or more rules to insert visual content items corresponding to charges of a particular charge type in the bill timeline such that the visual content items corresponding to charges of the particular charge type are aligned adjacent one another in a first dimension and visual content items corresponding to charges assessed in a particular billing period are aligned adjacent one another in a second dimension. The processor can insert, in the generated bill timeline, at least one visual content item corresponding to a one-time charge assessed during a particular billing period within a portion of the bill timeline corresponding to the billing period. The processor can then display, on a computing device, the bill timeline including the generated visual content items.

Figure 2:
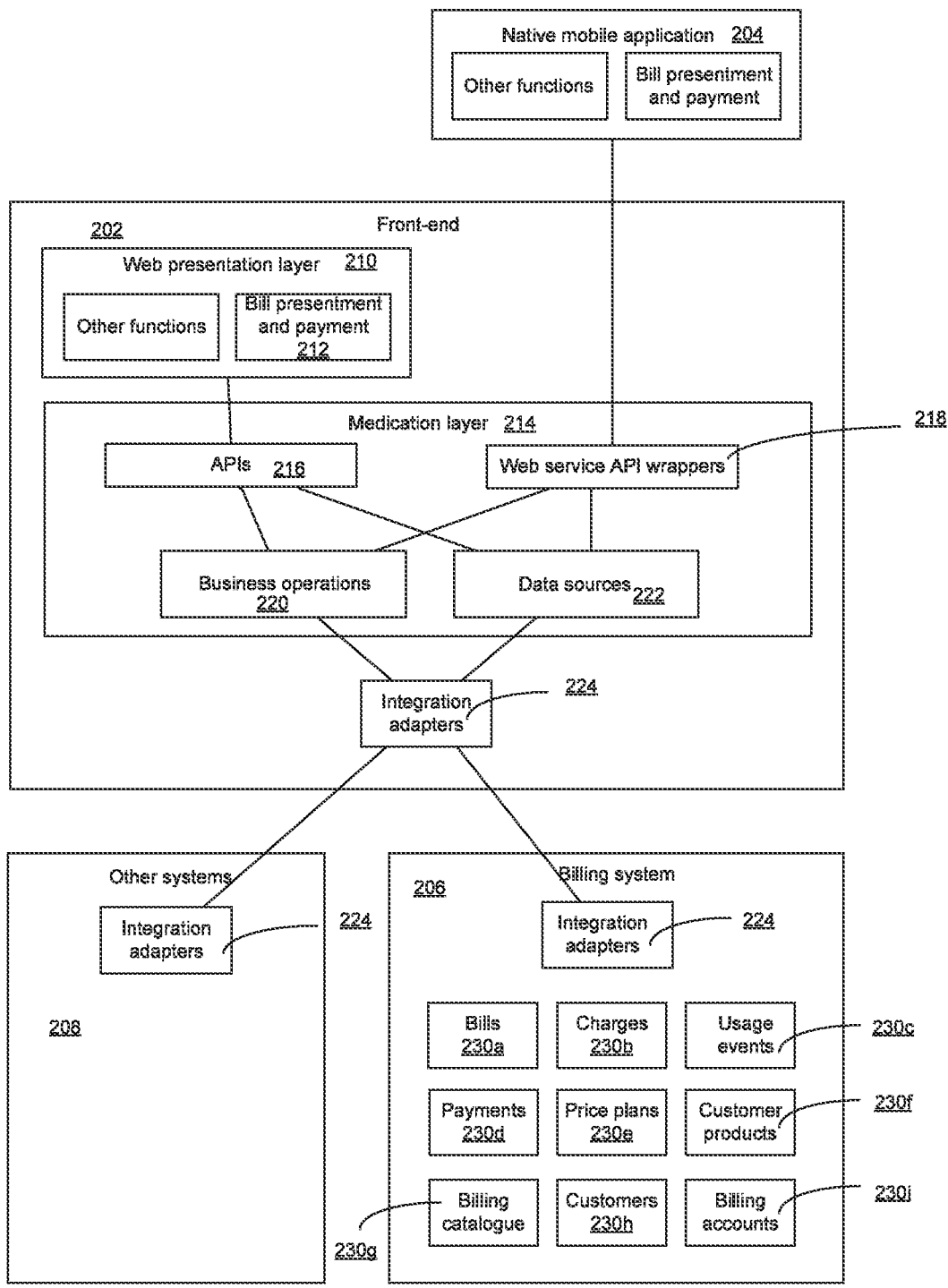
FIG. 2 is a block diagram depicting an embodiment of a bill generation environment.

FIG. 2 is a block diagram depicting an embodiment of a bill generation and presentation environment. The environment 200 includes a front end system 202, a native mobile application 204, a billing system 206, and one or more other systems 208. The native mobile application 204 may or may not be present in a specific environment. This environment 200 may be integrated into one or more existing systems and architectures. In some implementations, the environment can be used to generate and present bills in a bill timeline. In some implementations, the bills can be generated for a product, service or utility provider. For instance, examples of providers that may incorporate such an environment can include cellular data providers, internet service providers, cable or television service providers, electric, heat, or water providers, or any other provider that provides periodic invoices or bills to customers.

The front end system 202 includes a web presentation layer 210 that includes one or more modules, scripts, components, elements, or other objects capable of presenting bills along a bill timeline. The web presentation layer 210 includes a bill presentment and payment module 212 and may include modules capable of providing one or more other functions. The web presentation layer 210 can be configured to communicate with a mediation layer 214 to receive bill related information. The web presentation layer 210 can process the bill related information to generate bills along a bill timeline. Additional details of the web presentation layer 210 will be provided below.

The mediation layer 214 includes one or more APIs 216, one or more web service API wrappers 218, one or more business operation modules 220 and one or more data sources 222. The web service API wrappers 218 may be present in a specific environment. The APIs 216 and the web service API wrappers 218 may access, communicate, or otherwise exchange data with the business operation modules 220 and the data sources 222. The web service API wrappers 218 may be configured to communicate with native mobile applications 204 executing on mobile devices of one or more customers of the provider for which bills are generated and presented. The mediation layer 214 can communicate with the one or more billing systems 206 and other systems 208 via one or more integration adapters 224 that are configured to establish and maintain communications between the front end system 202 and the billing systems 206 and the other systems 208.

The billing system 206 can include one or more modules to facilitate the generation and management of bill related information. The billing system 206 can include a bills module 230a, a charges module 230b, a usage events module 230c, a payments module 230d, a price plans module 230e, a customer products module 230f, a billing catalog module 230g, a customers module 230h and a billing accounts module 230i.

The bills module 230a can be configured to manage and process bill related information. The bills module can receive information from one or more other modules 230b-230i of the billing system 206 to generate bills. The bill module 230a can share the bill related information with the front end system, where the web presentation layer 210 can generate and present the bill in a bill timeline. The charges module 230b can be configured to identify, process and manage one or more charges associated with services, products, or utilities consumed, purchased or otherwise associated with one or more customers. The usage events module 230c can track, manage and monitor events in which a customer used a particular product or service. The payments module 230d can track, manage and monitor payments received on one or more accounts. The price plans module 230e can track, manage and monitor price plan related information, including usage, pricing, promotions, discounts, among others. The customer products module 230f can track, manage and monitor information related to customer products, for example, a price, a connection date, a condition, or any other feature of customer products.

Figure 3:
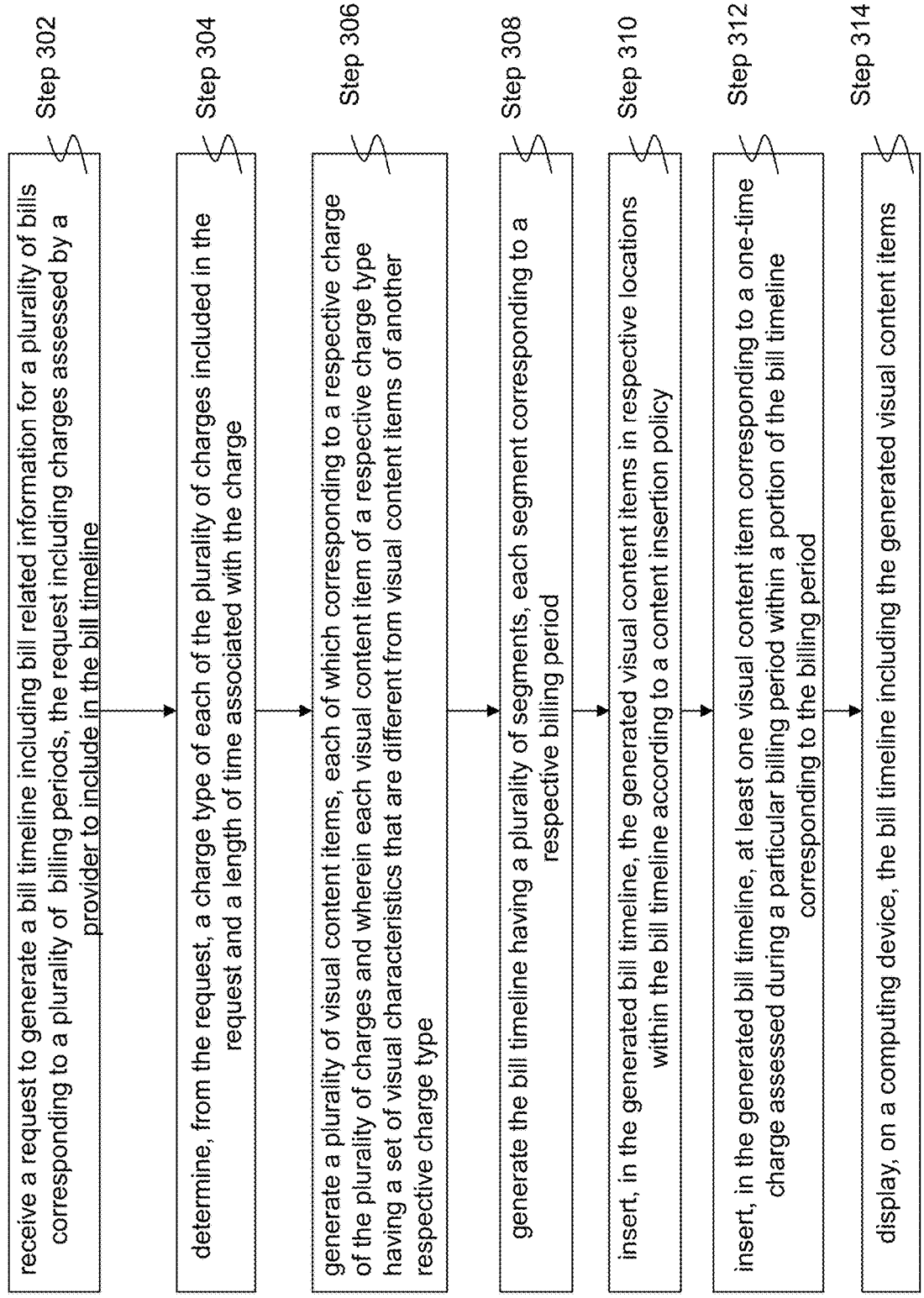
FIG. 3 is a flow chart of a method for generating and presenting bills in a bill timeline.

FIG. 3 is a flow chart of a method for generating and presenting bills in a bill timeline. In brief overview, a processor receives a request to generate a bill timeline including bill related information for a plurality of bills corresponding to a plurality of billing periods (BLOCK 302). The request can include charges assessed by a provider to include in the bill timeline. The processor determines, from the request, a charge type of each of the plurality of charges included in the request and a length of time associated with the charge (BLOCK 304). The processor generates a plurality of visual content items, each of which corresponds to a respective charge of the plurality of charges (BLOCK 306). Each visual content item of a respective charge type can have a set of visual characteristics that are different from visual characteristics of visual content items of another respective charge type. Moreover, each visual content item corresponding to a periodic charge can have a dimension that has a size that is based on a ratio of the length of time associated with the charge and a length of time associated with the billing period in which the charge was assessed. The processor generates the bill timeline including a plurality of segments (BLOCK 308). Each of the segments may correspond to a respective billing period. The processor inserts, in the generated bill timeline, the generated visual content items in respective locations within the bill timeline according to a content insertion policy (BLOCK 310). The content insertion policy can include one or more rules to insert visual content items corresponding to charges of a particular charge type in the bill timeline such that the visual content items corresponding to charges of the particular charge type are aligned adjacent one another in a first dimension and visual content items corresponding to charges assessed in a particular billing period are aligned adjacent one another in a second dimension. The processor inserts, in the generated bill timeline, at least one visual content item corresponding to a one-time charge assessed during a particular billing period within a portion of the bill timeline corresponding to the billing period (BLOCK 312). In some cases, this visual content item may correspond to an event charge, a payment, or an adjustment. The processor displays, on a computing device, the bill timeline including the generated visual content items (BLOCK 314).

In further detail, a processor receives a request to generate a bill timeline including bill related information for a plurality of bills corresponding to a plurality of billing periods (BLOCK 302). The request can include charges assessed by a provider to include in the bill timeline. The processor can be a portion of a web portion layer and can receive a request from a billing system.

The processor determines, from the request, a charge type of each of the plurality of charges included in the request and a length of time associated with the charge (BLOCK 304). A charge type can be based on a type of feature, service, product, among others. In some implementations, a charge type can be a subscription charge that is billed periodically or a one-time charge. Examples of charge types in the telecommunications field can include internet service plans, cable service plans, cellular service plans, insurance of devices, purchase of devices, overage charges, activation fees, installation charges, among others. Other examples can include charge types shown in the various bill timelines shown in FIGS. 4A-4Z and 4AA-4AB.

The processor generates a plurality of visual content items, each of which corresponds to a respective charge of the plurality of charges (BLOCK 306). Each visual content item of a respective charge type can have a set of visual characteristics that are different from visual characteristics of visual content items of another respective charge type. Moreover, each visual content item corresponding to a periodic charge can have a dimension that has a size that is based on a ratio of the length of time associated with the charge and a length of time associated with the billing period in which the charge was assessed. Examples of visible content items are shown in the various bill timelines shown in FIGS. 4A-4Z and 4AA-4AB. The visible content items can have various characteristics, such as color, size, shape, orientation and position, lines, thickness, among others. In some implementations, charges corresponding to periodic charges can be represented by visual content items that have a width, length or height that corresponds to a length of time the service for which the charge was assessed was activated during the billing period. As such, a charge for a service that is activated half way through a billing period may have a visual content item that has a length corresponding to half the length of a content item corresponding to a charge that was assessed for the full length of the billing period. Further, a height or width may correspond to an amount of the charge. In some implementations, the amount of the charge may be represented using a different visual characteristic, including a thickness of a line, a depth of a color, among others.

The processor generates the bill timeline including a plurality of segments (BLOCK 308). Each of the segments may correspond to a respective billing period. The processor inserts, in the generated bill timeline, the generated visual content items in respective locations within the bill timeline according to a content insertion policy (BLOCK 310). The content insertion policy can include one or more rules to insert visual content items corresponding to charges of a particular charge type in the bill timeline such that the visual content items corresponding to charges of the particular charge type are aligned adjacent one another in a first dimension and visual content items corresponding to charges assessed in a particular billing period are aligned adjacent one another in a second dimension. The content insertion policy can be defined by the web presentation layer.

The processor inserts, in the generated bill timeline, at least one visual content item corresponding to a one-time charge assessed during a particular billing period within a portion of the bill timeline corresponding to the billing period (BLOCK 312). In some implementations, to insert, in the generated bill timeline, at least one visual content item corresponding to a one-time charge assessed during a particular billing period within a portion of the bill timeline corresponding to the billing period, the processor can determine a date within the billing period on which the one-time charge was assessed or incurred and insert the visual content item corresponding to the one-time charge within a portion of the bill timeline corresponding to the date within the billing period.

In some implementations, to insert, in the generated bill timeline, the generated visual content items in respective locations within the bill timeline according to the content insertion policy, the processor can insert visual content items of charges of a first charge type in respective portions of the bill timeline such that the visual content items of charges of the first charge type are aligned in a first row and inserting visual content items of charges of a second charge type in respective portions of the bill timeline such that the visual content items of charges of the second charge type are aligned in a second row adjacent the first row.

In some implementations, the processor can further generate visual content items corresponding to credits associated with the account for which the bill timeline is generated and provide, for display, the visual content items corresponding to the credits in a portion of the bill timeline corresponding to a billing period within which the credit was received or applied.

In some implementations, the processor can further identify a plurality of charge types to group together, identify charges of the identified plurality of charge types, group together the charges of the identified plurality of charge types and generate a single visual content item corresponding to the identified charges grouped together. The processor can then provide, for display, the generated signal visual content item in a portion of the bill timeline corresponding to a billing period in which the charges that were grouped together were assessed.

The processor displays, on a computing device, the bill timeline including the generated visual content items (BLOCK 314). The computing device can be a computing device of a customer associated with an account to which the bill timeline corresponds. In some implementations, the computing device can be a computing device of an agent of the provider. In some such implementations, the agent may be a customer representative of the provider that can access the bill timeline in response to receiving a communication from the consumer associated with the bill timeline. In some implementations, the computing device can be a computing device that is communicatively coupled to a printer that can print the bill timeline.

In some implementations, each visual content item that corresponds to a periodic charge includes a first dimension and a second dimension. The first dimension has a first dimension size based on the ratio of the length of time associated with the charge and a length of time associated with the billing period in which the charge was assessed. The second dimension has a second dimension size based on an amount of the charge. In some such implementations, the first dimension is one of a width, length or height of the visual content item and the second dimension is another of the width, length or height of the visual content item.

In some implementations, the bill generation system can compute an aggregate of all the charges corresponding to each of the one or more of the billing periods and provide, for display, a total amount for a bill corresponding to a particular billing period based on the aggregate of all the charges corresponding to the particular billing period.

In some implementations, the generated bill timeline is interactive. In some implementations, the processor can receive an online action on a visual content item inserted in the generated bill timeline and provide, for display, responsive to the receiving the online action, a supplemental content item including additional details of the charge associated with the visual content item on which the online action was received. In some implementations, the bill generation system can receive an online action and trigger showing or hiding visual content for billing periods, customer locations, products, charges or groups of charges.

As described above, the bill generation system can be configured to generate the bill timeline. The bill timeline may represent multiple bills or bill estimates (for future billing periods) along a timeline. In some implementations, the same product, price plan, service, feature, device, event type, locations, product category, among others, that is present in one or more bills is shown in the same row. For example, if a customer subscribed to receive IPTV services in 6 bills, the charges for IPTV from these bills may be shown in the same row, and other bills that didn't have IPTV will have empty space in that row.

In some implementations, if a product, price plan, service, feature, device, or other entity associated with a charge has a start or an end date (or both), visual content items corresponding to the charge would be displayed with the dates. For example, the start and end dates may be represented as ends of the corresponding line in the linear view or start and end dates in the tabular view.

In some implementations, if a customer has switched to another plan for the same product, or to a related product, both products and the switch date are shown on the timeline to demonstrate the switch.

In some implementations, regular charges and credits may be displayed in the timeline. In some implementations, the credits may result from changed or disconnected products charged in advance, or from adjustments.

In some implementations, if a product, price plan, service, feature, device, event type, etc. has a one-time charge (there may be none, one or more one-time charges for the same chargeable entity), it is represented as an individual artifact (for example, a dot for video-on-demand events on the linear view, or charge name, amount and date on the tabular view).

In some implementations, usage-based charges may be represented as individual events (typical case for discrete events, e.g. video-on-demand) or be grouped (for example, internet traffic usage per billing period, or all long-distance calls made on the same day).

In some implementations, the timeline represents either bills for the same billing account, or bills from multiple billing accounts.

In some implementations, the timeline may represent situations where multiple billing accounts are merged to a smaller number of accounts (this includes, but is not limited to, the assumption of liability scenario), or some accounts are split to more billing accounts. The billing dates for any of these accounts may or may not be aligned, before or after the merge/split. All characteristics of the billing timeline apply to these scenarios as well. For example, if two billing accounts had each one wireless subscriber, each of them with mobile voice and mobile data products, were merged into one billing account, each of the products will be presented in its own row, and each of these rows will extend before and after the merge. The billing dates for the two original accounts before the merge may or may not be aligned, and these dates in turn may or may not be aligned with the billing dates of the new billing account resulting from the merge In some implementations, the timeline may group products, price plans, services, features, devices, event types, etc. by any criteria (for example, by the same location, or subscriber, or product category, or billing account, etc.). If they are grouped, the group may be static, or may be expandable/collapsible by a user interacting with the system via web user interface or the user interface of the native mobile application. The subtotals per group may or may not be displayed in the bill (usually they are).

In some implementations, individual charges may or may not have pop-up windows with details and additional operations (for example, submit or cancel charge dispute, approve dispute, give adjustment, etc.). The list of available operations in part depends on the role of a user interacting with the system (for example, operations available to call center agents may be different from those available to resellers, or customers interacting with the system via a self-service portal). The charge details displayed in this window depend on the charge type. For periodic charges, the charge details can include a proration period. For individual multimedia event charges, the charge can identify a name of a movie, song, program or other content item. For individual call event charges, the charge can include region, country and call duration. For grouped discrete events (for example, all international calls per day), the charge can include a table with the same details for all the grouped events. For continuous grouped events (for example, internet traffic or local calls), the charge can include usage bars for discount buckets.

In some implementations, the timeline may or may not be scrollable to view additional billing periods. If it is scrollable, it may or may not have boundaries (the first bill, the earliest available bill, the latest estimated bill, etc.).

In some implementations, billing periods can be equal or different (for example, the first billing period is usually shorter than the regular ones. Interim bills (between regular periodic ones) can be displayed as well. Initiation and final bills can be displayed, and their dates may fall outside of the regular periodic billing dates.

In some implementations, the charges may or may not be represented as rectangles, with width (aligned with the timeline direction) representing a length of time or charge validity (for example, full billing period or prorated), and height representing charge amount. These rectangles may sit on top of each other, and may have gaps between them (for example, when a product is disconnected during a billing period, and no charge applies for the remainder of the period).

In some implementations, service usage may cause additional one-time or product charges to be applied in one or more bills. These may be shown as regular one-time or product charges, with proration period, if needed, under the basic product charge. This is typically used to visualize tiered data usage plans (e.g. $x for the first X MB per month, $y if the monthly traffic is between X and Y MB per month, $z if the monthly traffic is between Y and Z MB per month, and q cent/MB for any traffic above Z.

In some implementations, while the timeline may be represented linearly, the timeline may alternatively be represented using tables, bars or other visual constructs. In some implementations, the tables, bars or other visual constructs can be oriented horizontally or vertically. In some implementations, the tables, bars or other visual constructs can be in 2 dimensional form or in 3 dimensional form. Without limiting the variants of the 3 dimensional form, in some implementations, the 3 dimensional form has one dimension that corresponds to time (the same as in 2 dimensional form), another dimension that corresponds to customer locations, and the third dimension that corresponds to products provided in this customer location.

In some implementations, the timeline may be presented as a video (with a voice over or without) instead of a static page.

In some implementations, the bill timeline can include bills corresponding to a plurality of billing periods. In some implementations, the bills included in the bill timeline may be arranged sequentially according to a temporal scheme, for instance, new to old, or alternatively, old to new. In some implementations, the bills included in the bill timeline may or may not be arranged consecutively.

In some implementations, the bill timeline may show charges assessed in each of a plurality of bill periods. In some implementations, the bill timeline may show deposits received from a payee of the bills. In some implementations, these deposits may or may not be displayed. In some implementations, similar to deposits, payments received from a payee may or may not be displayed.

In some implementations, the timeline may be to scale (as in the linear view) or not (as in the tabular view). In some implementations, different visual characteristics, such as colors, shapes, lines, among others, may or may not be used to represent different charge types, products, price plans, features, services, devices, locations, subscribers, billing accounts, among others.

The bill timeline can be used to display bills associated with a wide range of applications, including but not limited to telecommunications, wireless, wireline, and cloud products, among others. In some implementations, the bill timeline can also be used to display bills related to applications outside of the telecommunications domain. For example, electricity, gas, water supply, logistics, video, music or other content delivery companies. It should be appreciated by one having ordinary skill in the art that the bill timeline can be used for any application in which bills can include recurring (subscription-based) charges and incidental (one-time or usage-based) charges.

The bill timeline can allow a provider to improve customer service, satisfaction, retention and referrals. This results in an increase in profitability for the provider. Moreover, it can reduce the volume of calls received by call centers of the provider, thereby reducing costs incurred by the provider to maintain the call center, further increasing profitability. The bill timeline can further attract customer attention. As the bill timeline may be interactive, customers may be able to interact with the bills to learn more details. As a result, customers may no longer need to call the provider for clarification on charges included in their bills. The bill timeline is especially efficient in clarifying initial and final bills to customers, as these bills typically include additional types of charges, and include pro-rated charge amounts that differ from those on usual periodic bills.

In some implementations, the bill timeline can generate bill estimates for future billing periods. The bill estimates will appear in a manner similar to bills charged to the customer. By including forward looking information regarding future bills, customers can identify when certain promotions expire or take effect. In this way, instead of a customer receiving a higher than anticipated bill due to an expired promotion thereby increasing customer dissatisfaction due to bill shock, the customer can proactively take steps to change the customer's subscriptions to avoid bill shock.

The bill timeline can further be configured to allow a customer to make changes to the account via the bill timeline. For instance, a customer can define a date and select products or services for splitting or merging accounts. A customer may be able to select a date to terminate a product or service. On the provider's end, an agent can access the bill timeline to select a charge to give customer a credit to compensate for the charge, or allow the agent to make other changes to the account, such as changing start or termination dates to adjust proration, resulting in automatically generating a credit to compensate for the change.

Figure 4B:
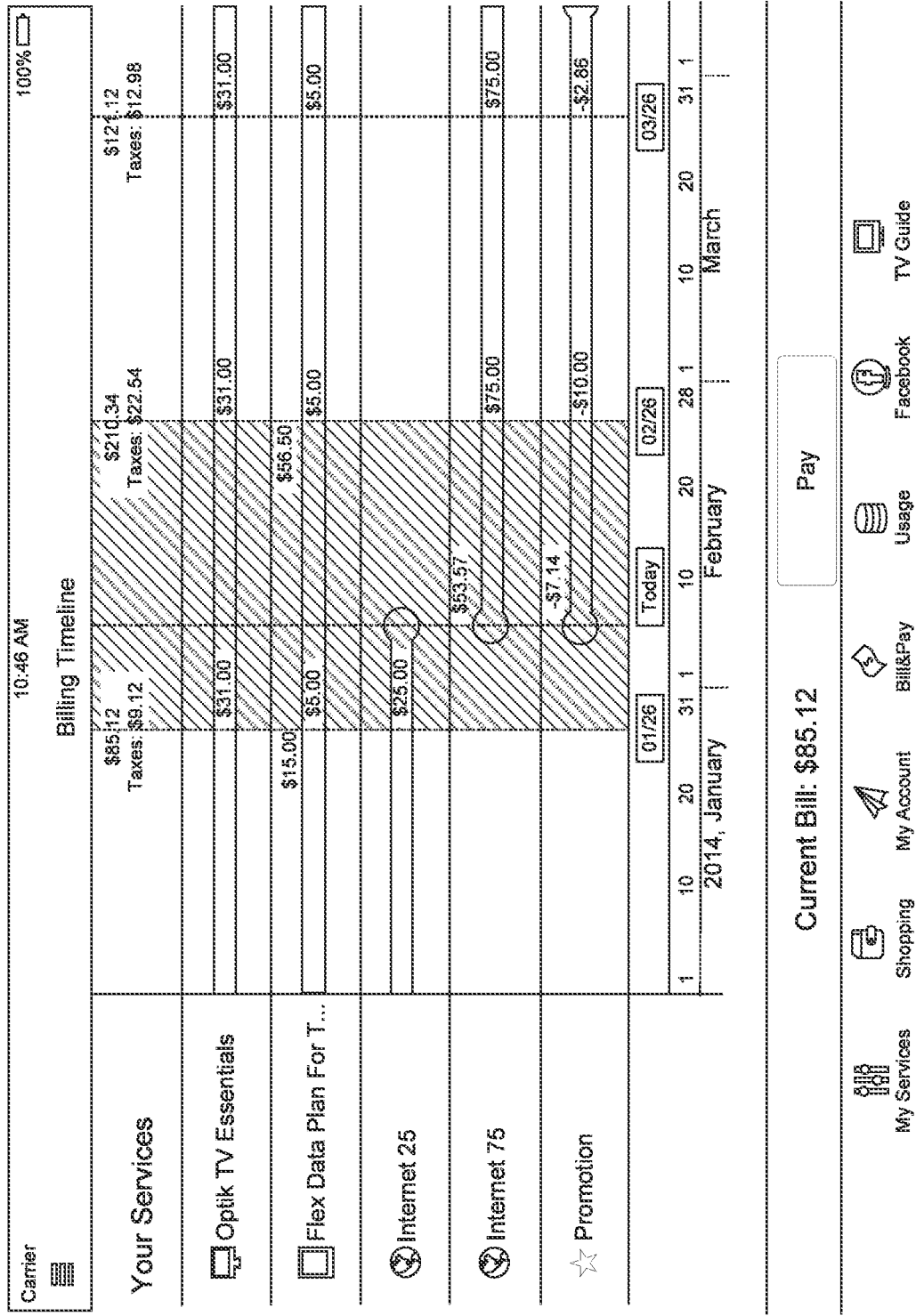
FIGS. 4A-4Z and 4AA-4AC are screenshots and wireframes of a user interface that includes the bill timeline.
Figure 4C:
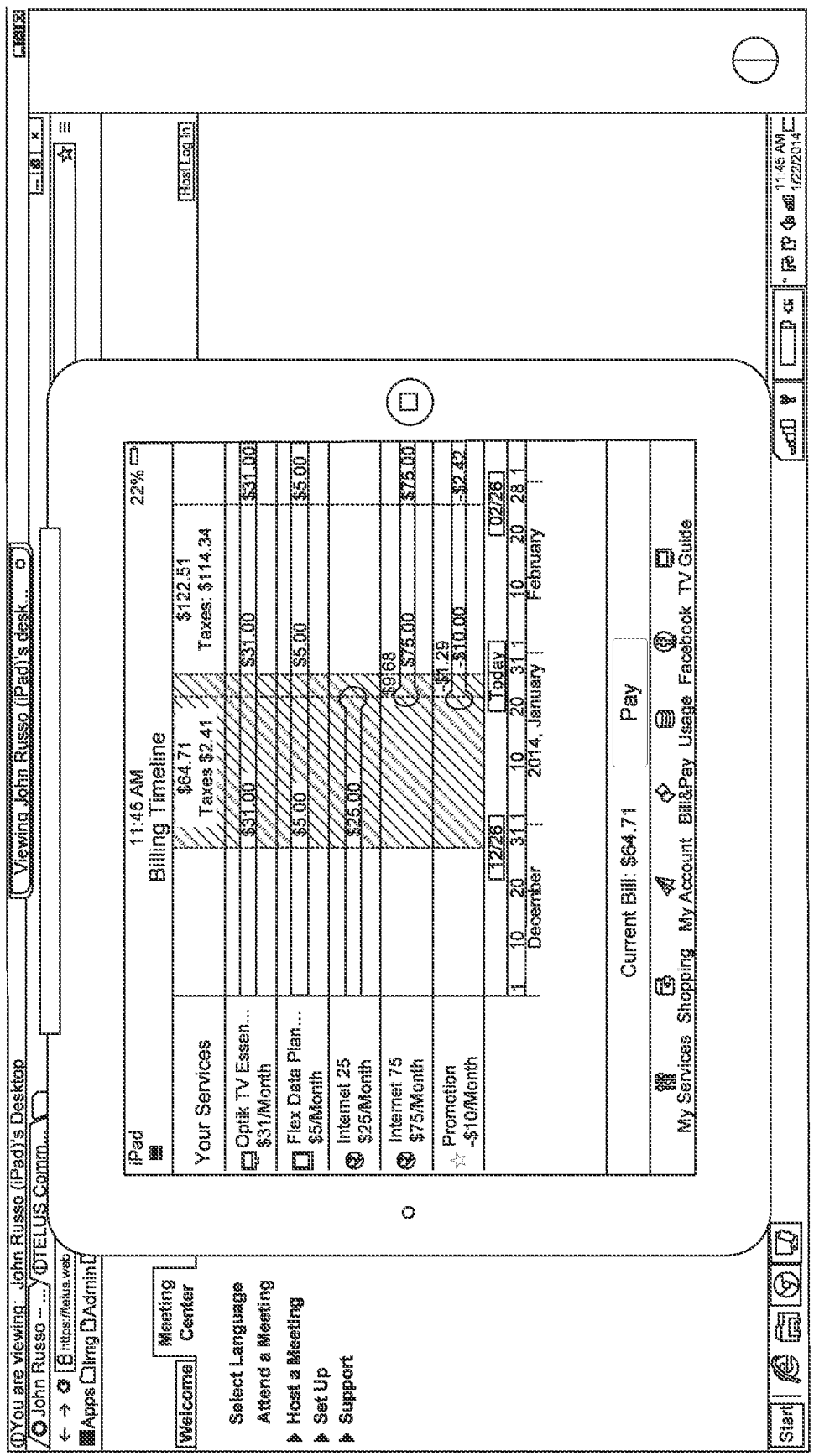
Figure 4D:
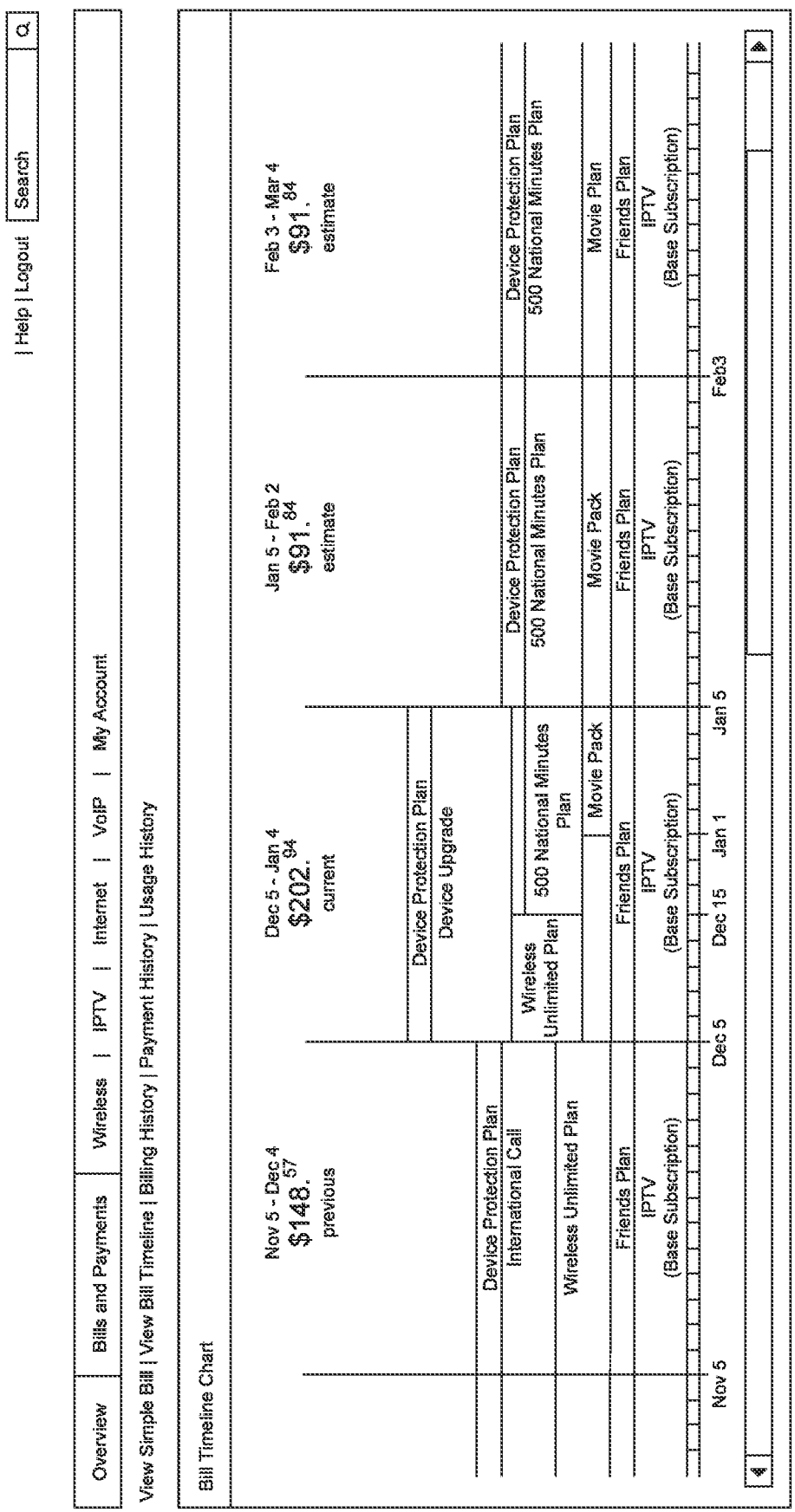
Figure 4E:
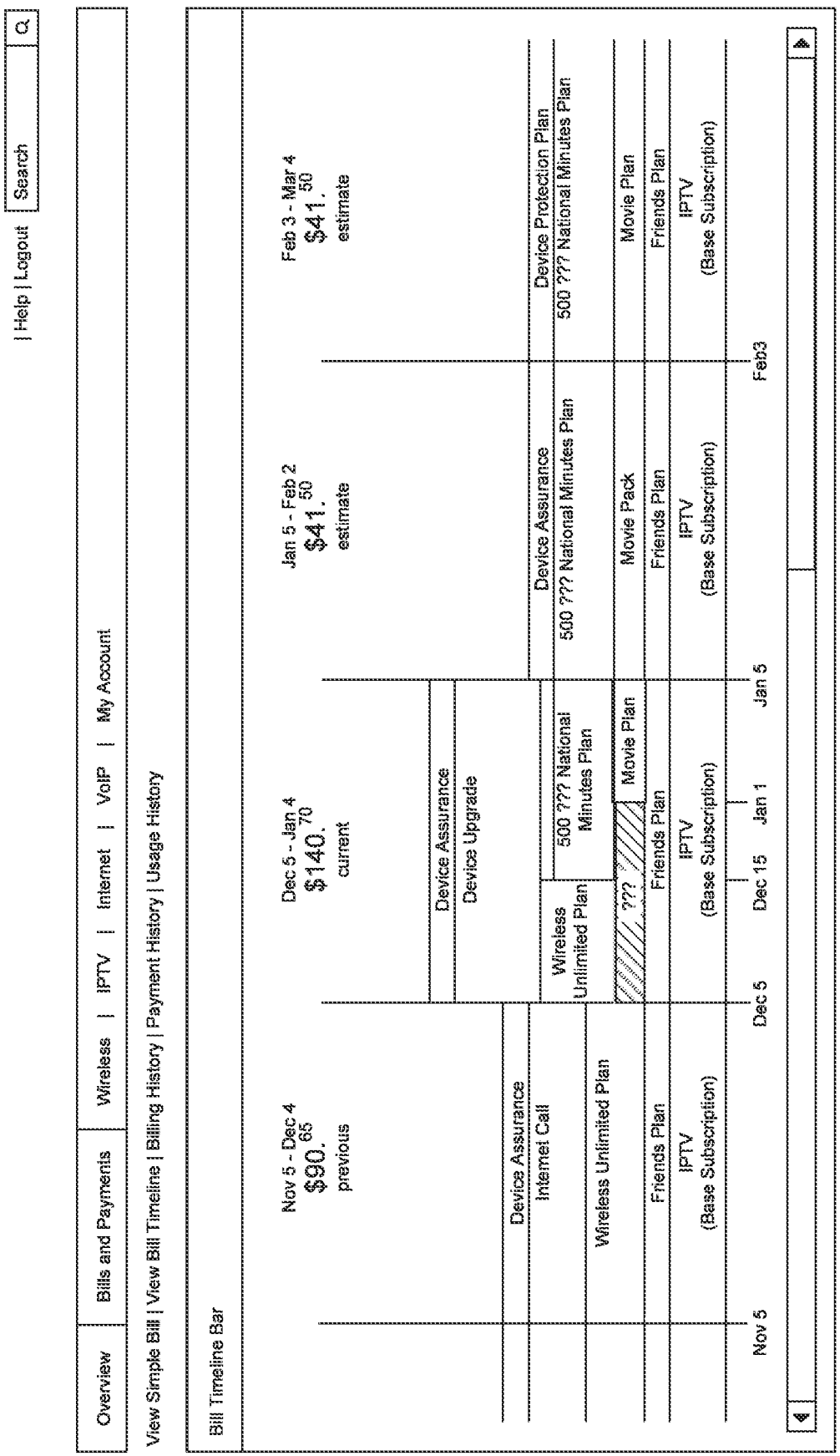
Figure 4I:
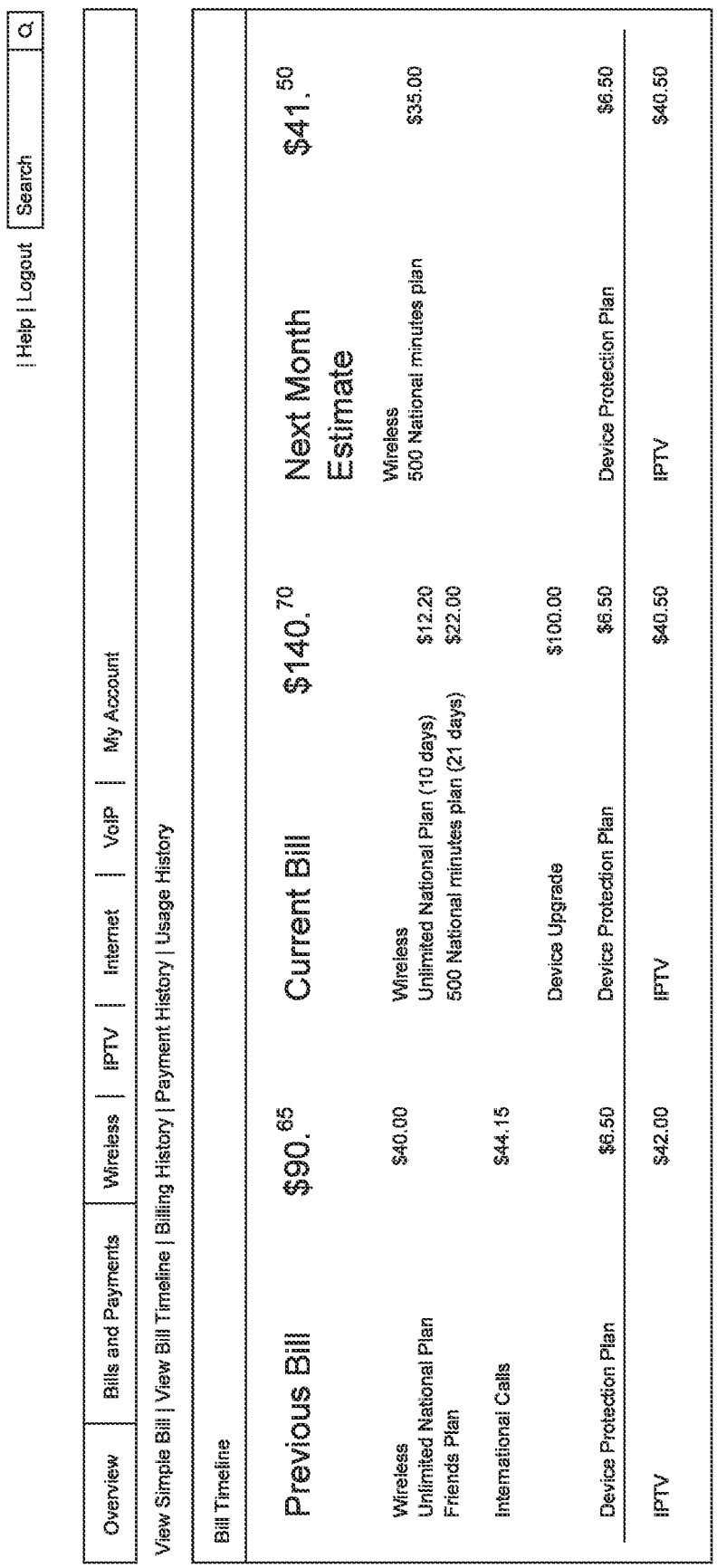
Figure 4K:
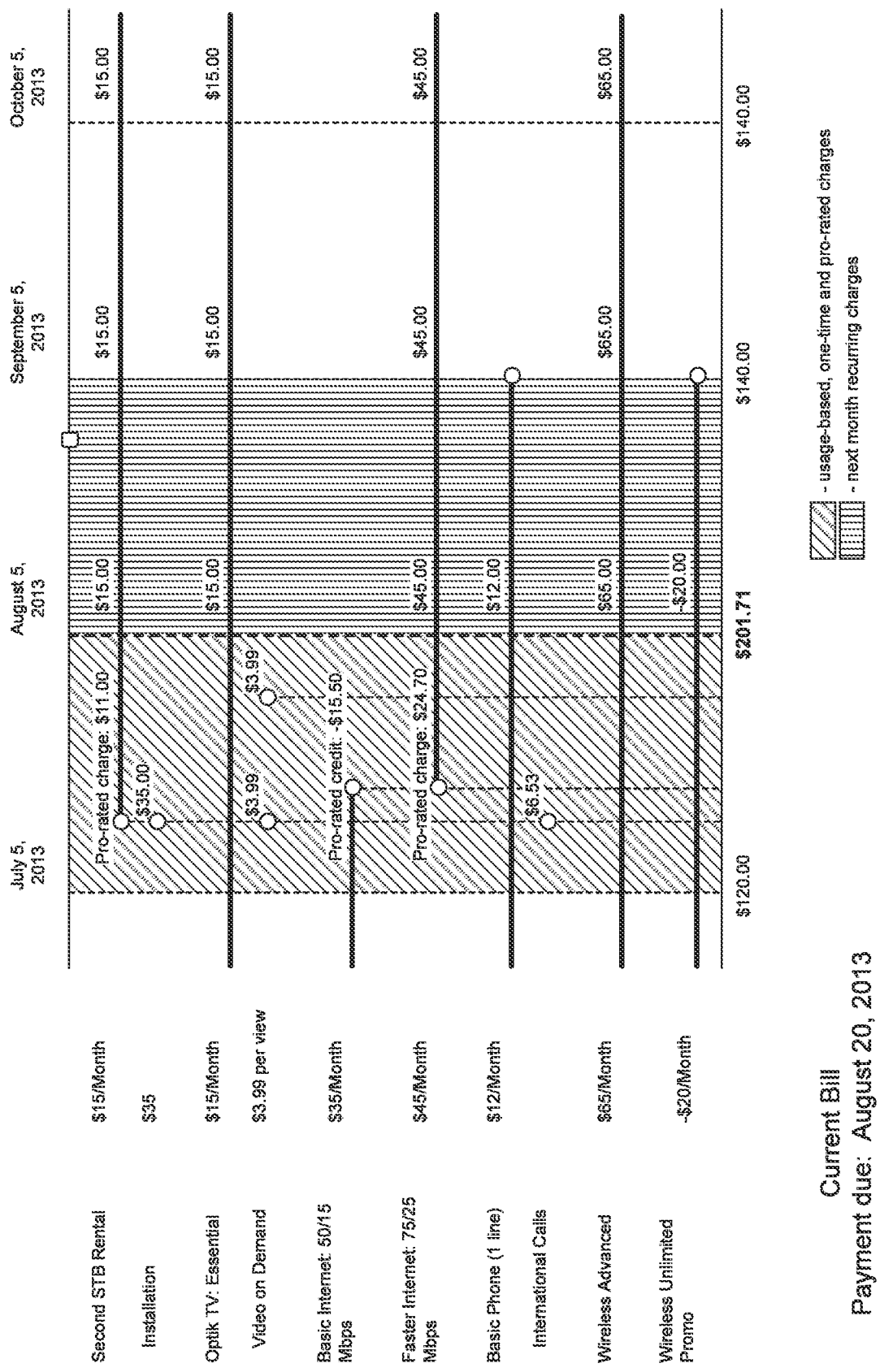
Figure 4L:
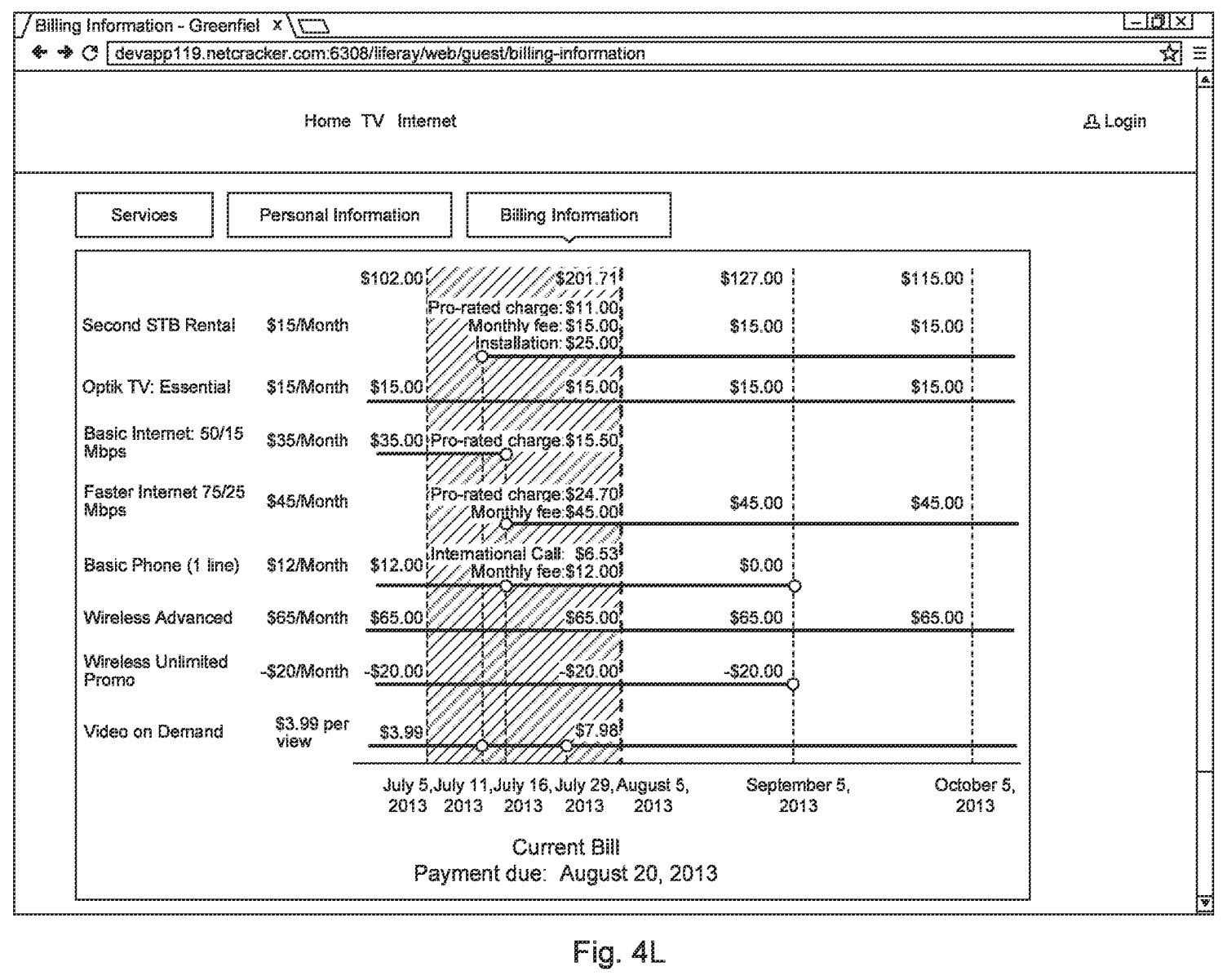
Figure 4M:
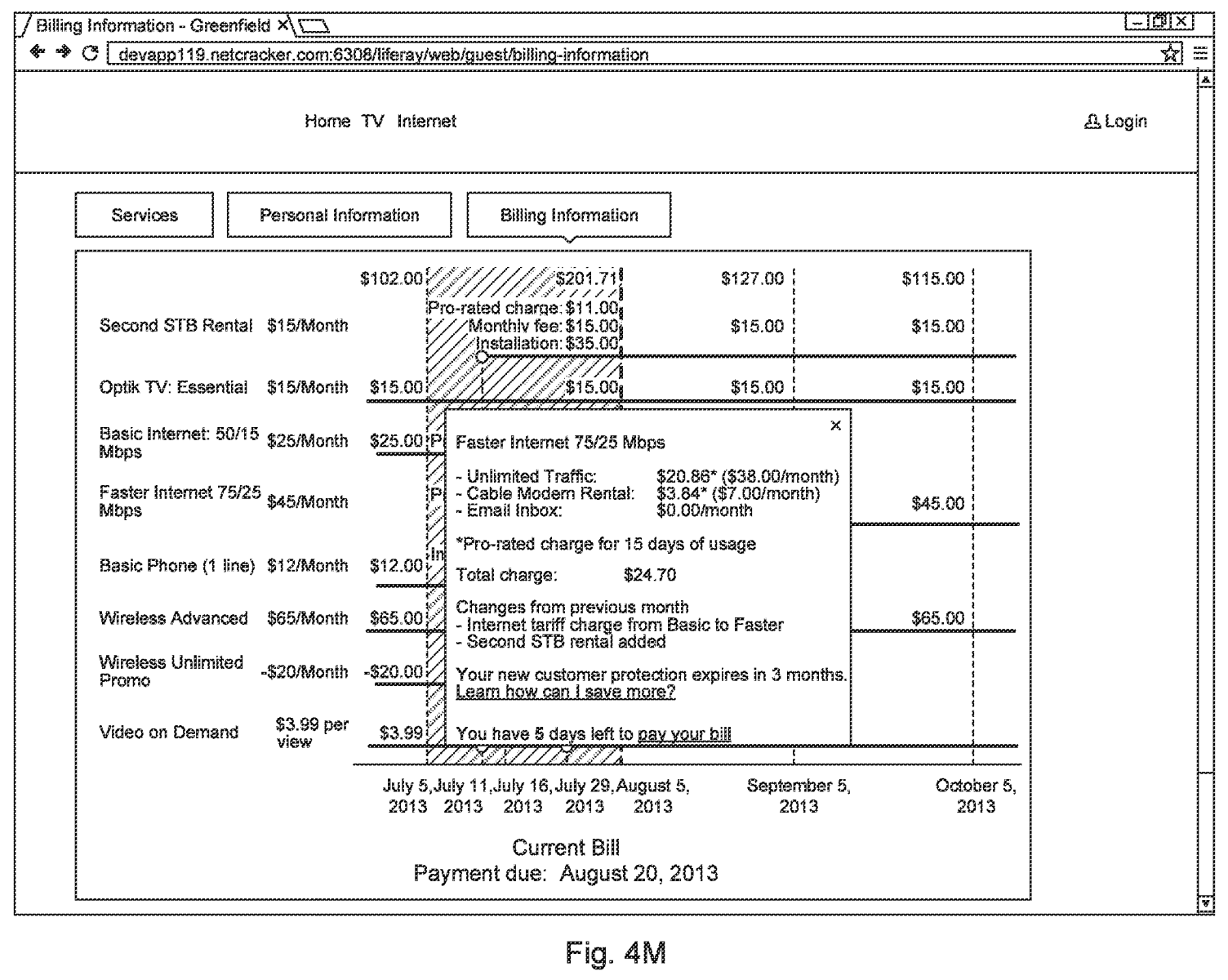
Figure 4O:
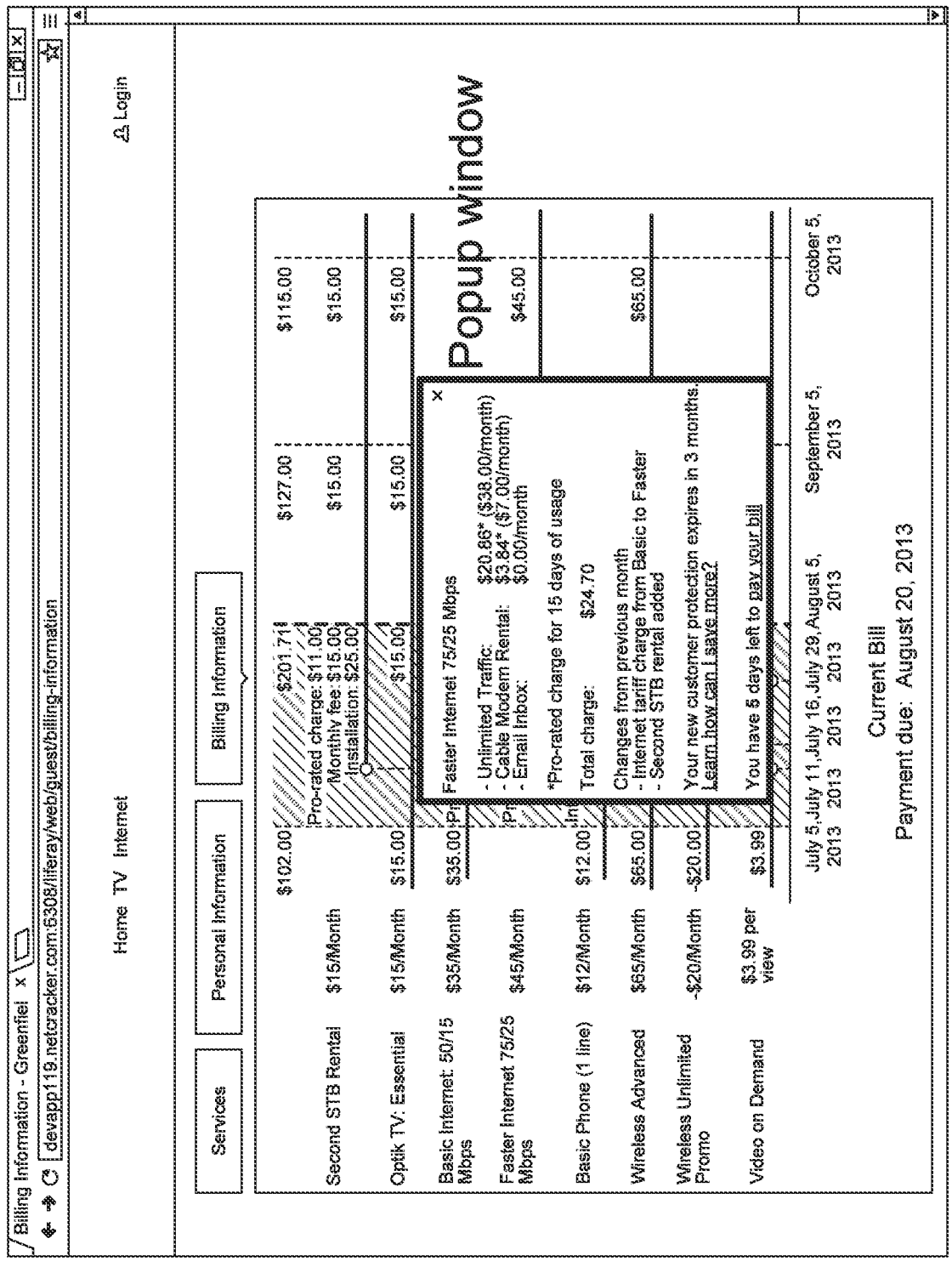
Figure 4P:
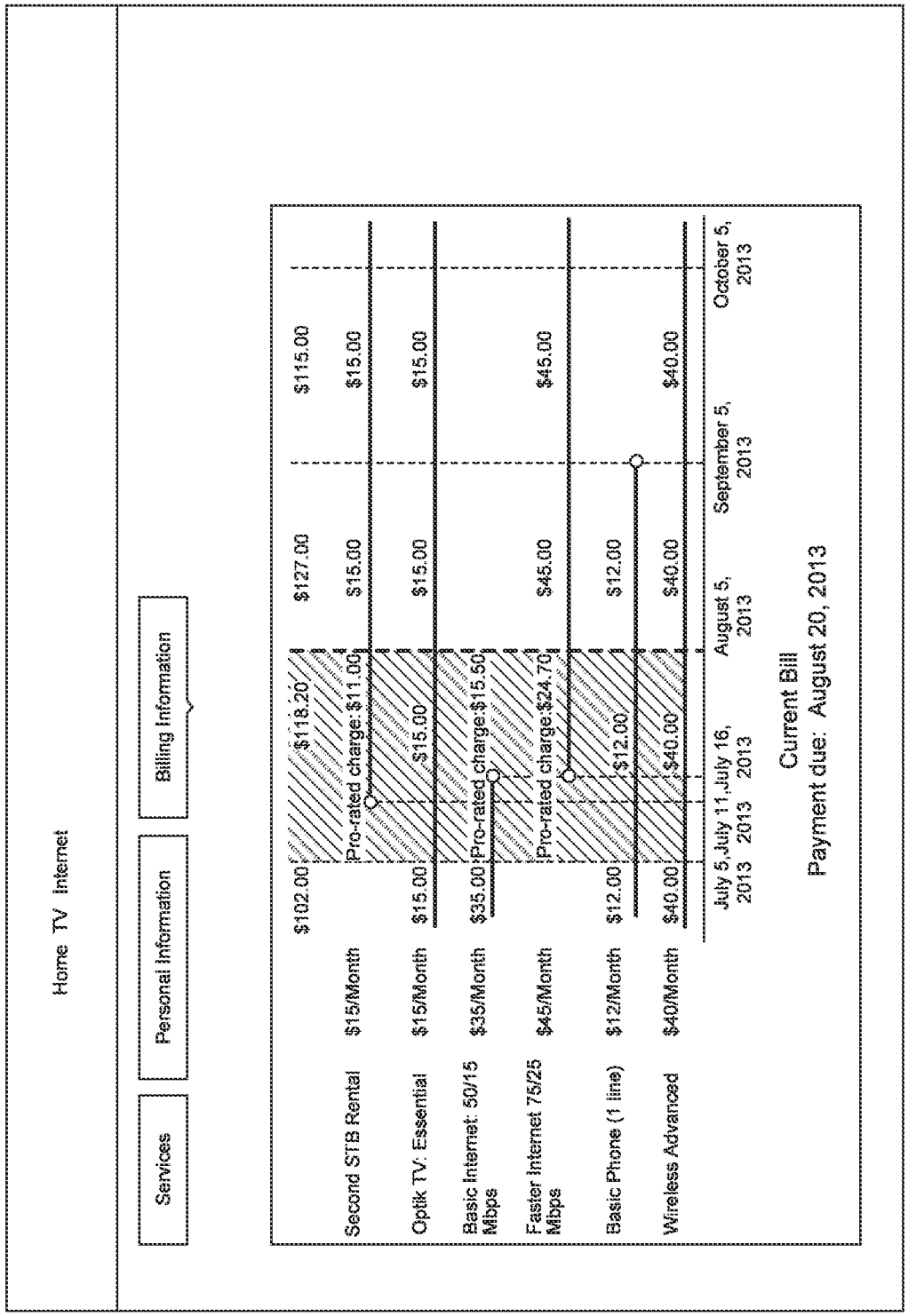
Figure 4Q:
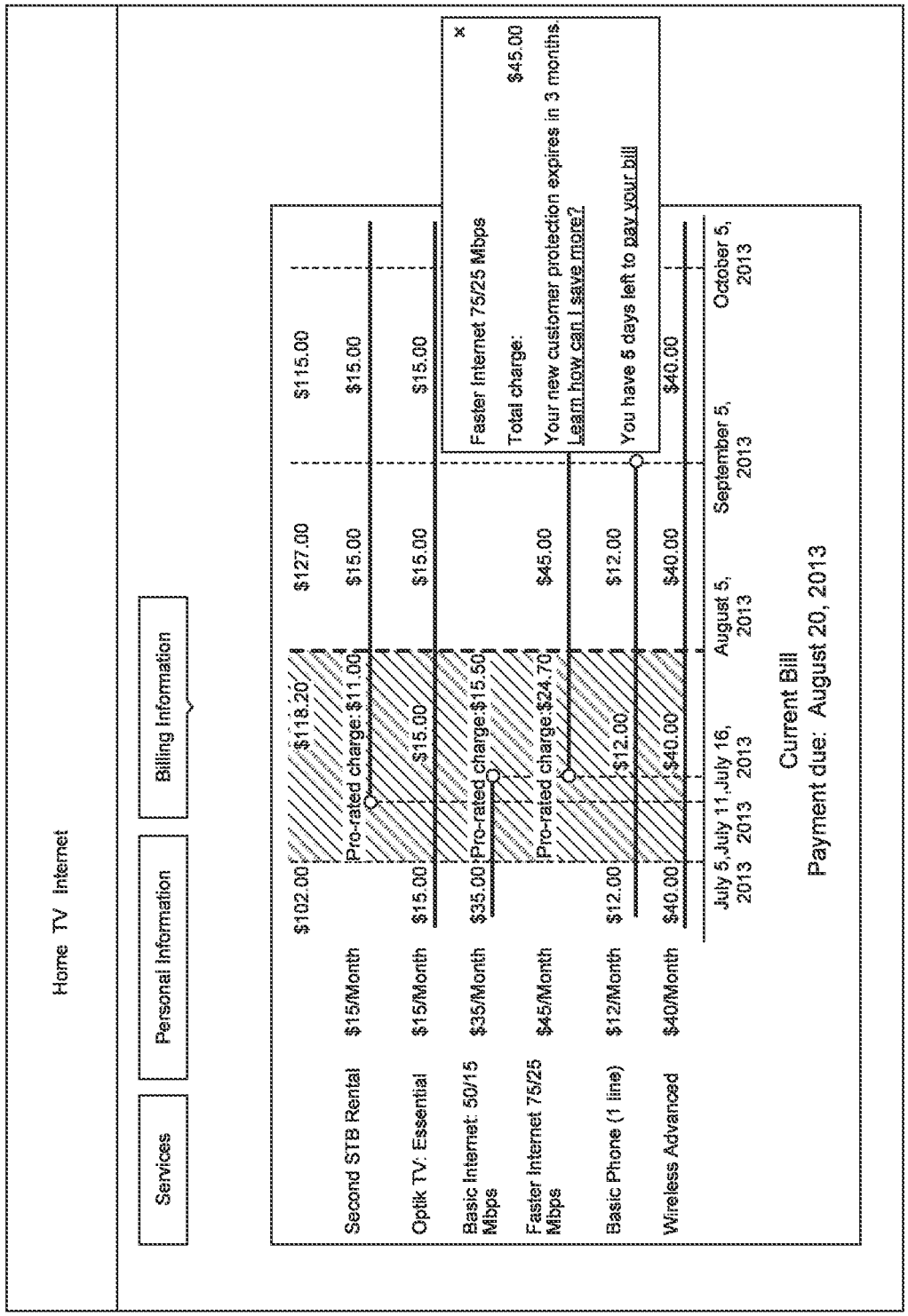
Figure 4R:
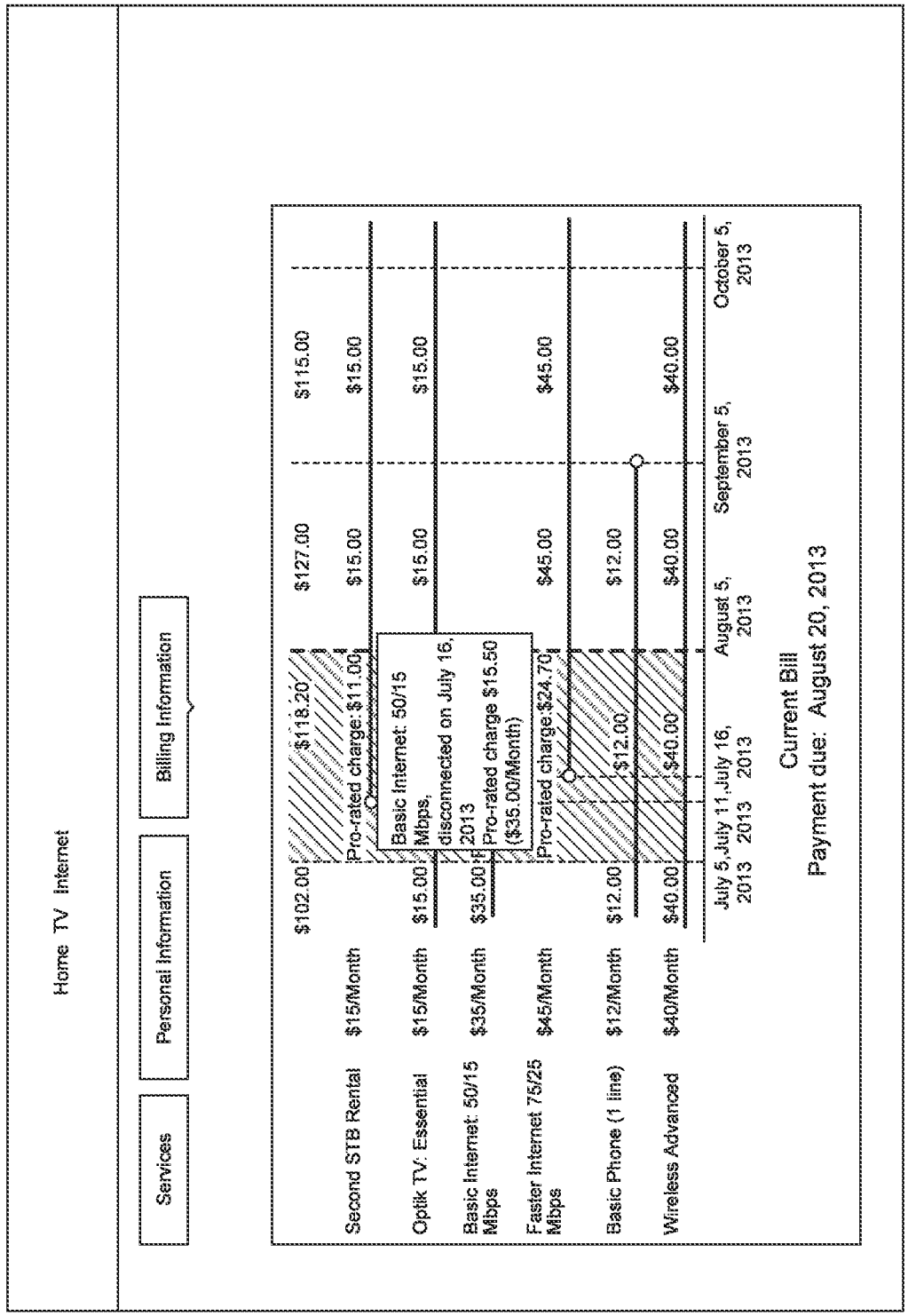
Figure 4S:
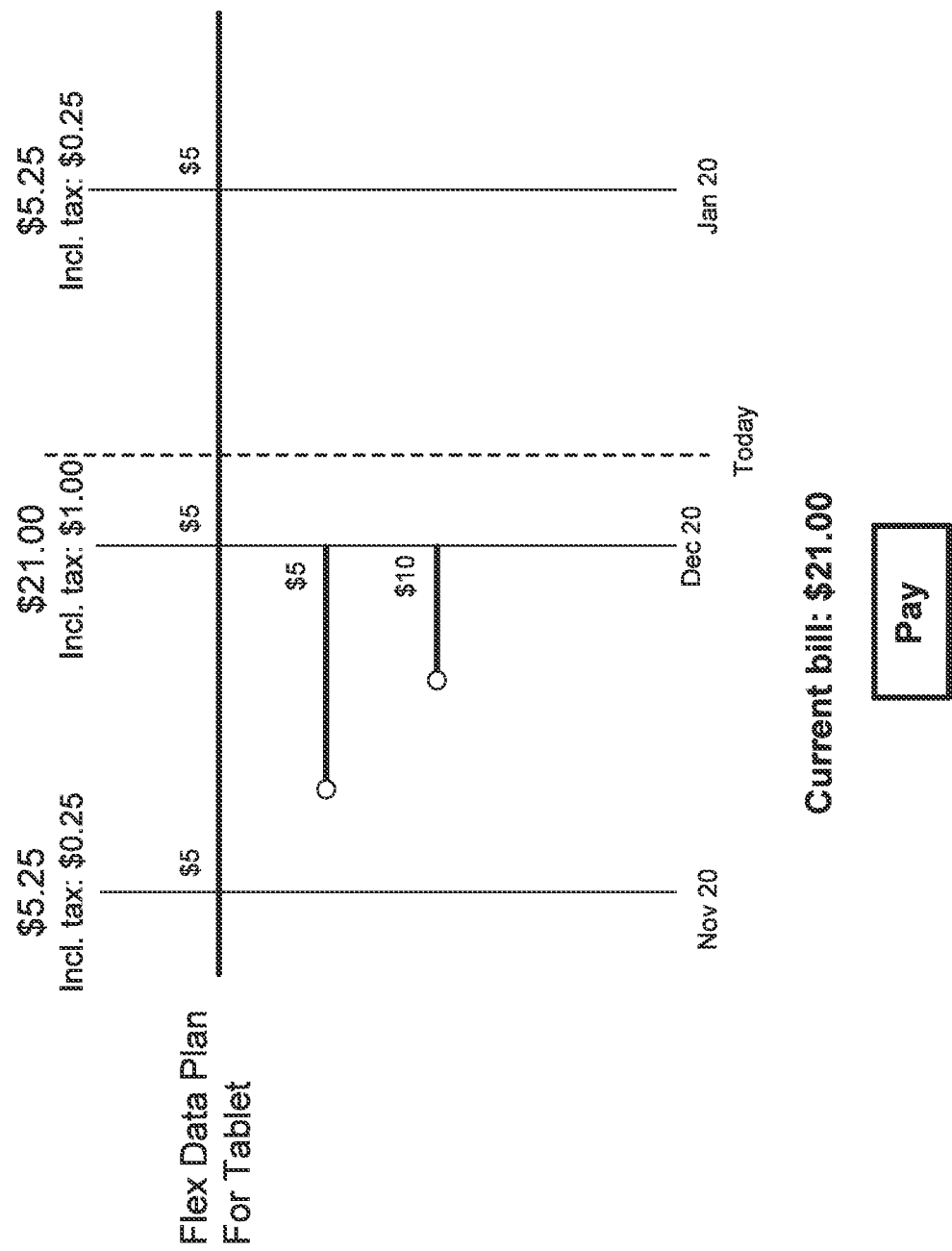
Figure 4U:
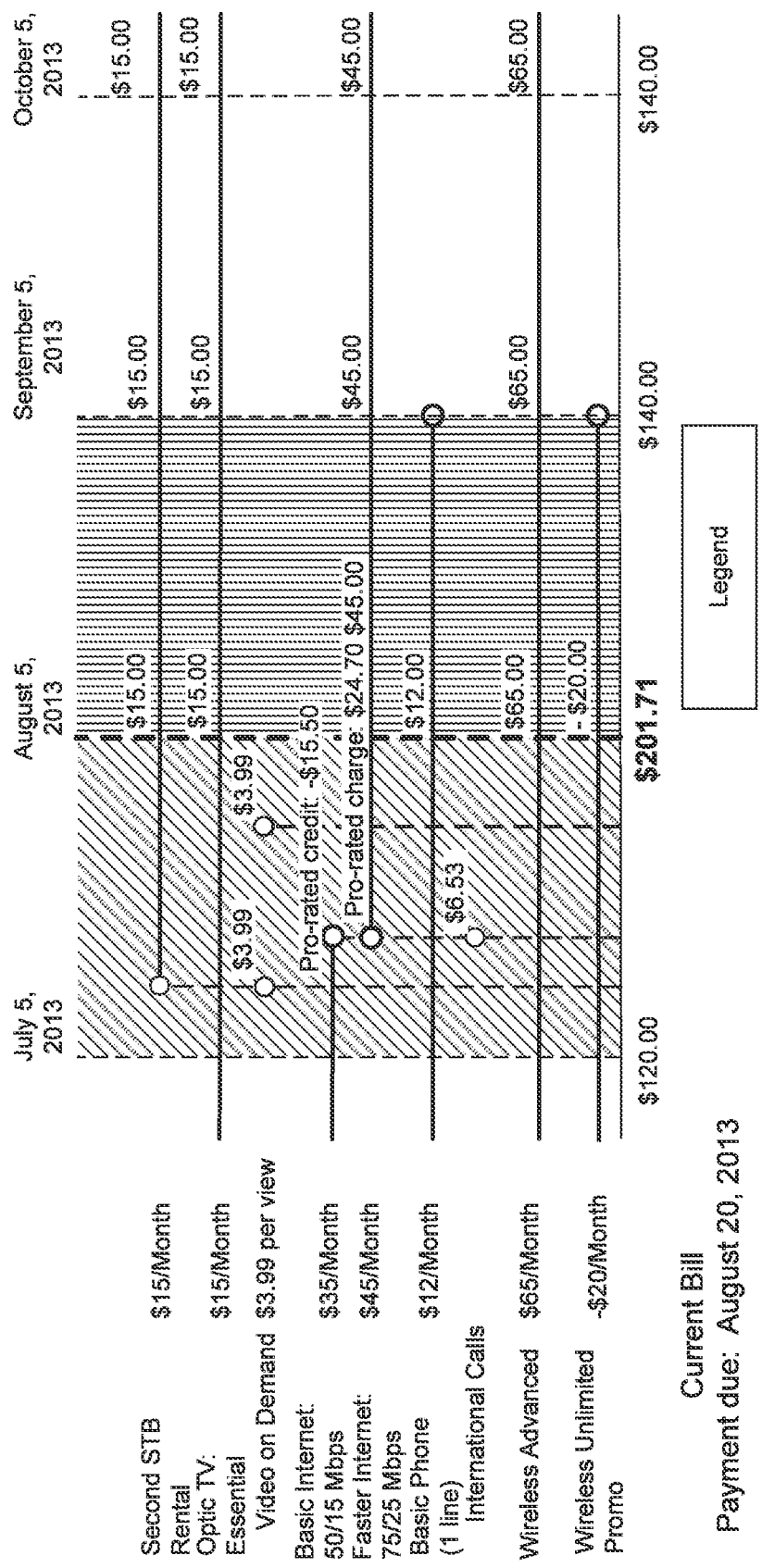
Figure 4V:
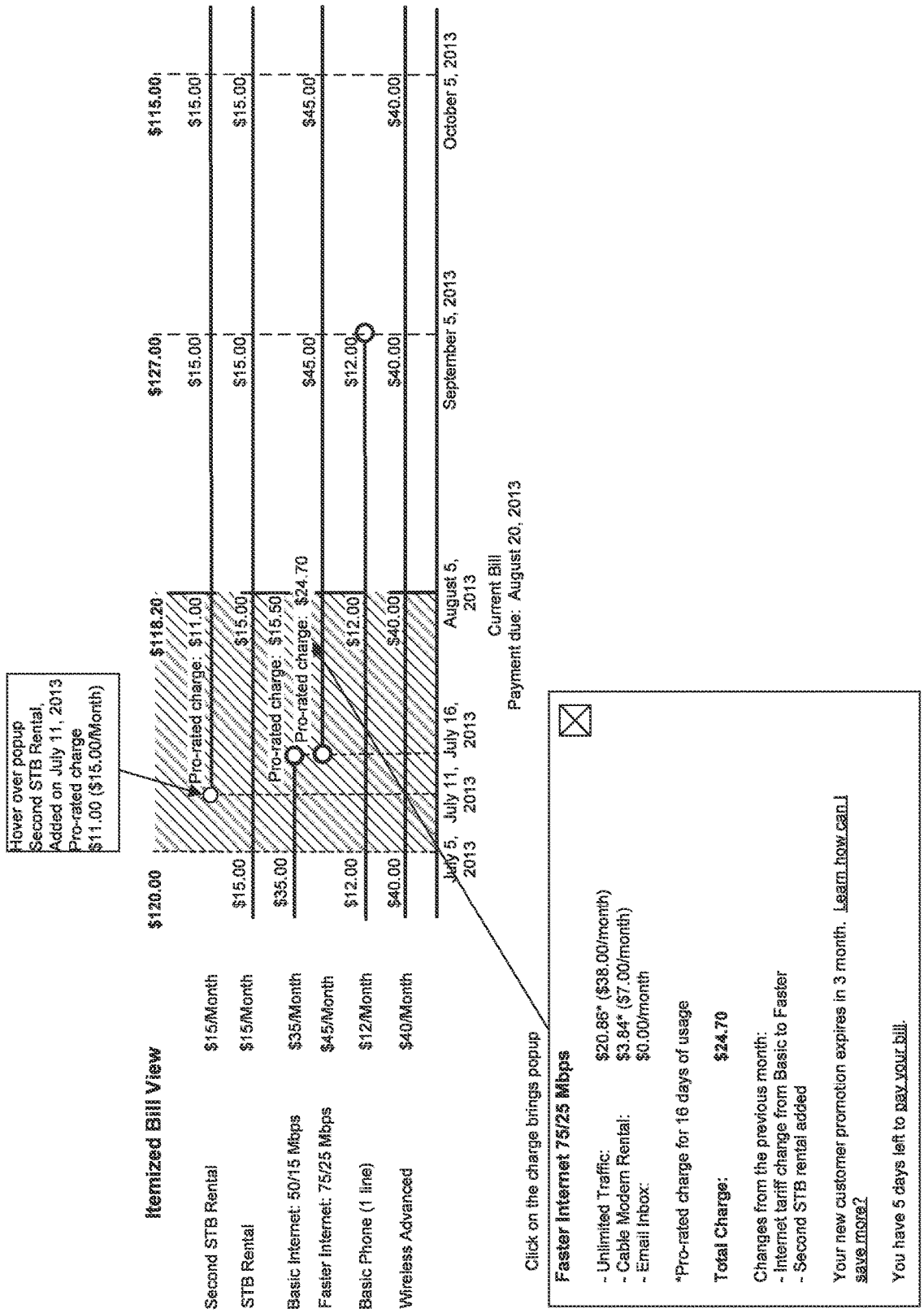
Figure 4W:
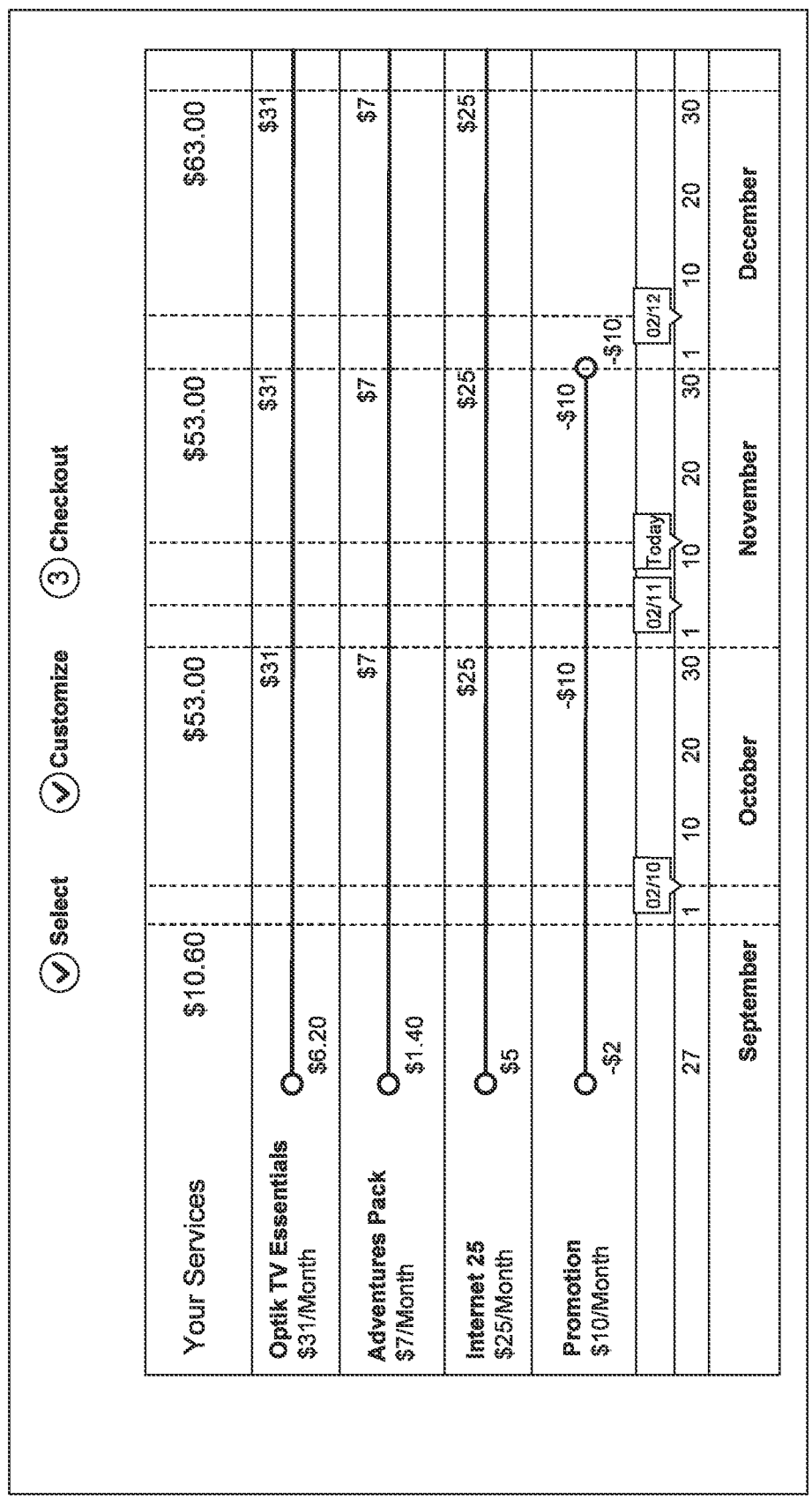
Figure 4X:
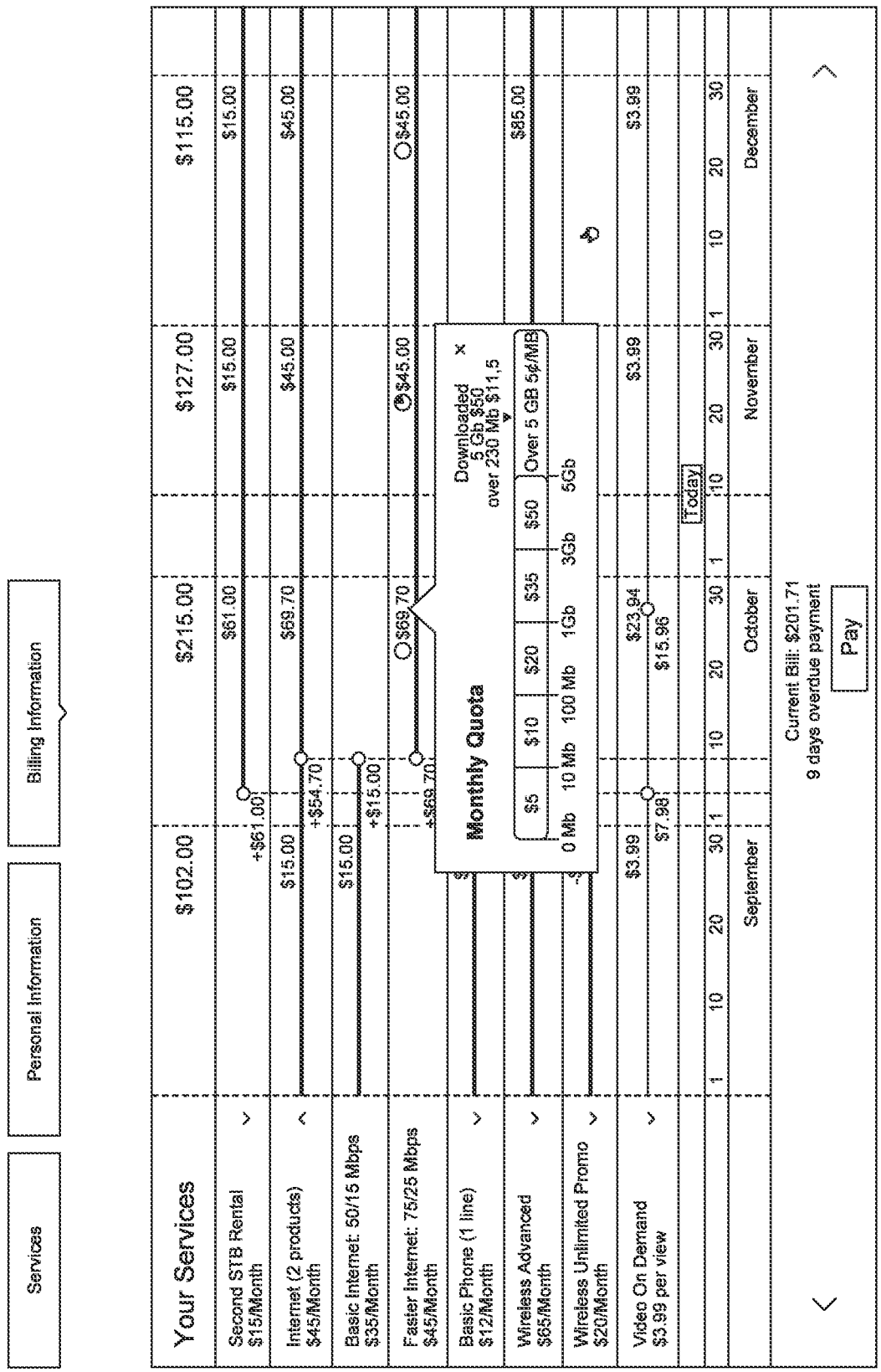
Figure 4Y:
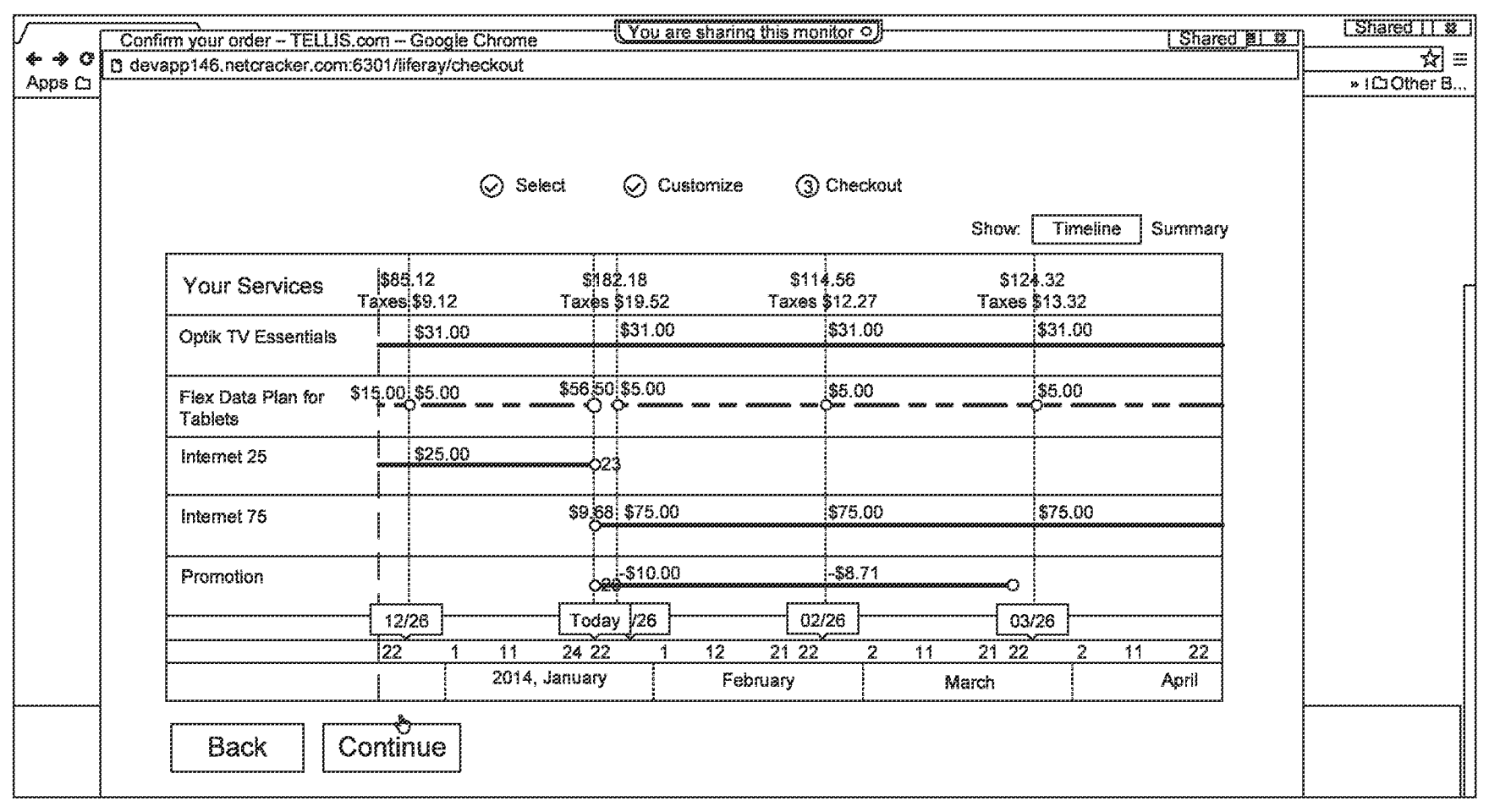
Figure 4Z:
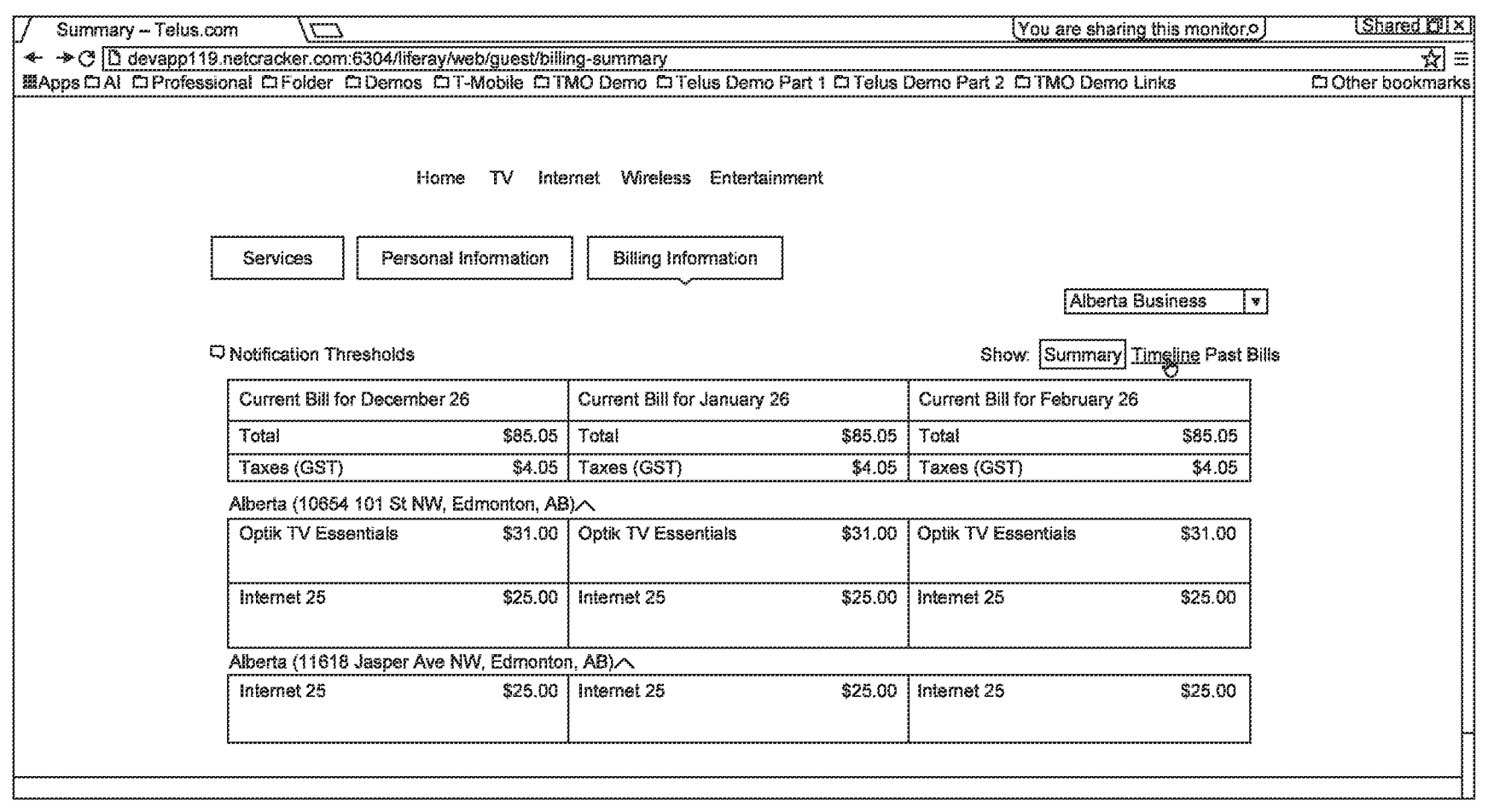
Figure 4A:
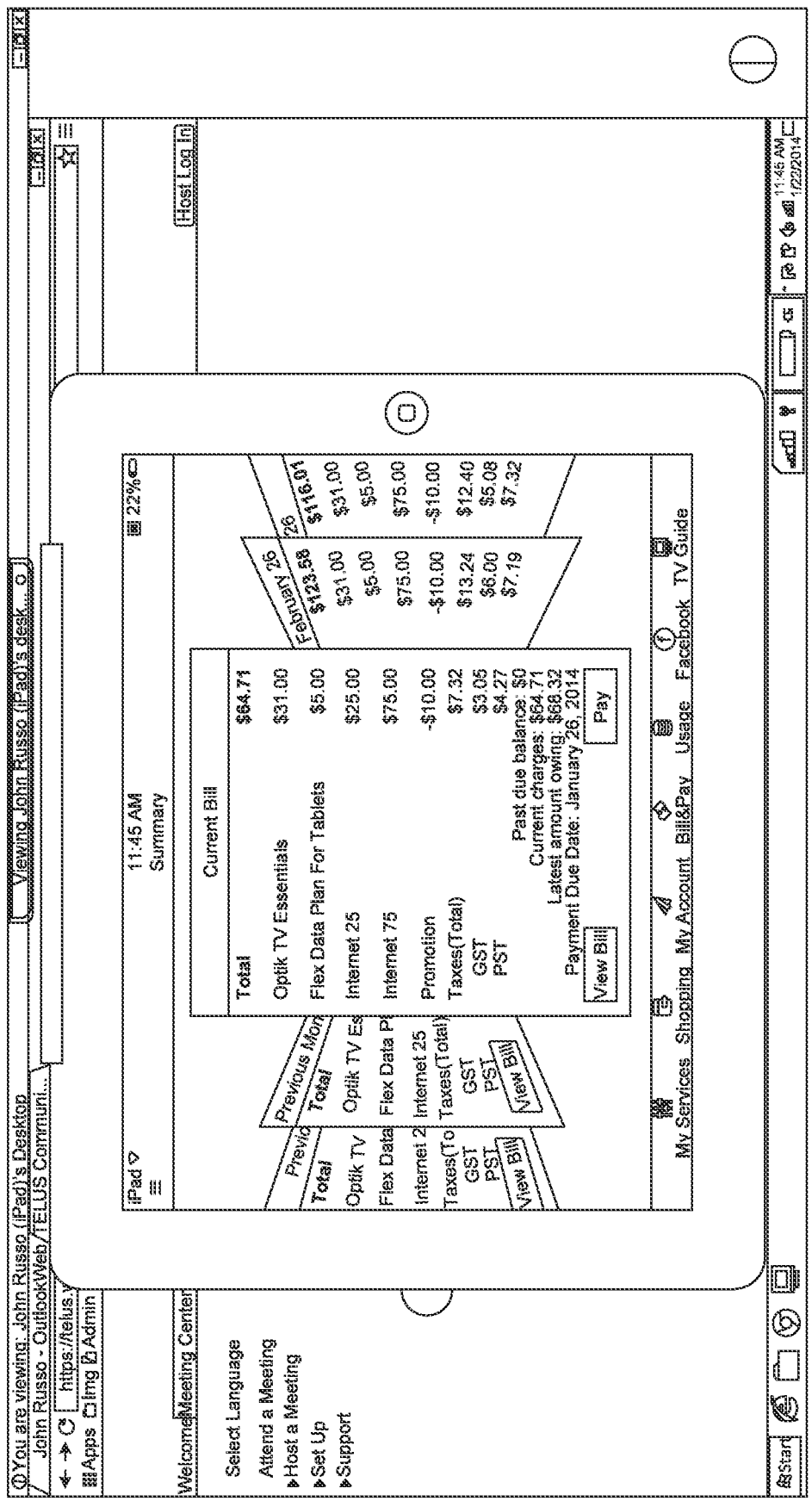

FIGS. 4A-4Z and 4AA-4AC are screenshots of a web interface that includes the bill timeline. Various implementations of the bill timeline are displayed. Some of the features of the bill timeline are ornamental in nature. Some of the features of the bill timeline are optional and are design features. FIGS. 4S and 4T are wireframes representing what the bill timeline on an actual display would look like. FIGS. 4B, 4C and 4AB are screenshots of a native mobile application rather than web pages. They correspond to device 102n on FIGS. 1A and 1B, and to box 204 on FIG. 2.

While the invention has been particularly shown and described with reference to specific embodiments, it should be understood by those skilled in the art that various changes in form and detail may be made therein without departing from the spirit and scope of the invention described in this disclosure.

While this specification contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Having described certain embodiments of the methods and systems, it will now become apparent to one of skill in the art that other embodiments incorporating the concepts of the invention may be used. It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, Objective-C, Javascript, or in any byte code language such as JAVA. The software programs may be stored on or in one or more articles of manufacture as object code.

What is claimed is:

1. A method for dynamically retrieving and displaying supplemental content via interactions responsive to generating and presenting bills in a bill timeline, comprising:

executing, by a bill generation system including one or more processors, a mediation layer in communication with a web presentation layer and one or more billing systems, the web presentation layer configured to receive bill related information from the one or more billing systems via the mediation layer, the mediation layer including one or more integration adapters configured to establish and maintain communications between the web presentation layer and the one or more billing systems, the mediation layer in communication with one or more native applications executing on one or more mobile devices and configured to communicate with the one or more native applications using API service wrappers to provide bill timelines generated by the bill generation system for presentation on the one or more mobile devices;

receiving, by the bill generation system, a request to generate the bill timeline including the bill related information for a plurality of bills corresponding to a plurality of billing periods, the request including a plurality of billing charges assessed by a provider to include in the bill timeline;

determining, from the request, a billing charge type of each of the plurality of billing charges included in the request and a first length of time associated with a billing charge of the plurality of billing charges;

generating, by the bill generation system, a plurality of visual content items, each of which corresponding to a respective billing charge of the plurality of billing charges and wherein each visual content item of a respective billing charge type having a set of visual characteristics that are different from visual content items of another respective billing charge type, and wherein each visual content item corresponding to a periodic billing charge includes a first dimension and a second dimension, the first dimension having a first dimension size based on a ratio of i) a second length of time in a billing period that the billing charge was assessed and ii) a third length of time of the billing period in which the billing charge was assessed, and the second dimension having a second dimension size based on an amount of the billing charge;

generating, by the bill generation system, the bill timeline having a plurality of segments, each segment corresponding to a respective billing period of the plurality of billing periods, the respective billing period extending from a first end to a second end, the first end positioned at a first position along the billing period corresponding to when the billing charge began for the billing period and the second end positioned at a second position along the billing period corresponding to when the billing charge ended for the billing period;

generating, by the bill generation system, visual content items corresponding to credits associated with an account for which the bill timeline is generated;

inserting, in the generated bill timeline, the generated visual content items in the plurality of segments within the bill timeline according to a content insertion policy, the content insertion policy including one or more rules to insert visual content items corresponding to billing charges of a particular billing charge type in the bill timeline such that the visual content items corresponding to billing charges of the particular billing charge type are aligned adjacent to one another in the first dimension and visual content items corresponding to billing charges assessed in a particular billing period of the plurality of billing periods are aligned adjacent to one another in the second dimension perpendicular to the first dimension, the billing charges of the particular billing charge type including a first billing charge type and a second billing charge type, the first billing charge type aligned in a first row in the first dimension, the second billing charge type aligned in a second row in the first dimension;

identifying at least one interactive visual content item corresponding to a one-time billing charge assessed during the particular billing period;

generating at least one portion of the bill timeline corresponding to the particular billing period for insertion of the at least one interactive visual content item by moving the first billing charge type or the second billing charge type from the first row or the second row, respectively, within the particular billing period to the second row or a third row, respectively, within the particular billing period;

inserting, into the at least one portion of the bill timeline, the at least one interactive visual content item;

providing, for display, the visual content items corresponding to the credits in the bill timeline corresponding to the billing period within which the credits were received or applied;

displaying, on the one or more mobile devices, the bill timeline including the provided visual content items;

receiving, from the one or more mobile devices, an online action on an interactive visual content item of the at least one interactive visual content item inserted in the generated bill timeline; and dynamically providing, for display, responsive to the receiving the online action, a supplemental content item including additional details of the billing charge associated with the visual content item on which the online action was received.

2. The method of claim 1, wherein inserting, in the generated bill timeline, the at least one visual content item corresponding to the one-time billing charge assessed during the particular billing period within the at least one portion of the bill timeline corresponding to the billing period includes:

determining a date within the billing period on which the one-time billing charge was assessed or incurred; and inserting the visual content item corresponding to the one-time billing charge within the at least one portion of the bill timeline corresponding to the date within the billing period.

3. The method of claim 1, further comprising:

identifying, by the bill generation system, a plurality of billing charge types to group together;

identifying billing charges of the identified plurality of billing charge types;

grouping together the billing charges of the identified plurality of billing charge types;

generating a single visual content item corresponding to the identified billing charges grouped together; and providing, for display, the generated single visual content item in the bill timeline corresponding to the billing period in which the billing charges that were grouped together were assessed.

4. The method of claim 1, wherein the first dimension is one of a width, length or height of the visual content item and the second dimension is another of the width, length or height of the visual content item.

5. The method of claim 1, further comprising:

computing, by the bill generation system, an aggregate of all the billing charges corresponding to each of the plurality of billing periods; and providing, for display, a total amount for a bill corresponding to the particular billing period based on the aggregate of all the billing charges corresponding to the particular billing period.

6. A system for dynamically retrieving and displaying supplemental content via interactions responsive to generating and presenting bills in a bill timeline, comprising:

a bill generation system including:

a memory storing processor-executable instructions; and a processor configured to execute the processor-executable instructions to:

execute a mediation layer in communication with a web presentation layer and one or more billing systems, the web presentation layer configured to receive bill related information from the one or more billing systems via the mediation layer, the mediation layer including one or more integration adapters configured to establish and maintain communications between the web presentation layer and the one or more billing systems, the mediation layer in communication with one or more native applications executing on one or more mobile devices and configured to communicate with the one or more native applications using API service wrappers to provide bill timelines generated by the bill generation system for presentation on the one or more mobile devices;

receive a request to generate the bill timeline including the bill related information for a plurality of bills corresponding to a plurality of billing periods, the request including a plurality of billing charges assessed by a provider to include in the bill timeline;

determine, from the request, a billing charge type of each of the plurality of billing charges included in the request and a first length of time associated with a billing charge of the plurality of billing charges;

generate a plurality of visual content items, each of which corresponding to a respective billing charge of the plurality of billing charges and wherein each visual content item of a respective billing charge type having a set of visual characteristics that are different from visual content items of another respective billing charge type, and wherein each visual content item corresponding to a periodic billing charge includes a first dimension and a second dimension, the first dimension having a first dimension size based on a ratio of i) a second length of time in a billing period that the billing charge was assessed and ii) a third length of time of the billing period in which the billing charge was assessed, and the second dimension having a second dimension size based on an amount of the billing charge;

generate the bill timeline having a plurality of segments, each segment corresponding to a respective billing period of the plurality of billing periods, the respective billing period extending from a first end to a second end, the first end positioned at a first position along the billing period corresponding to when the billing charge began for the billing period and the second end positioned at a second position along the billing period corresponding to when the billing charge ended for the billing period;

generate visual content items corresponding to credits associated with an account for which the bill timeline is generated;

insert, in the generated bill timeline, the generated visual content items in the plurality of segments within the bill timeline according to a content insertion policy, the content insertion policy including one or more rules to insert visual content items corresponding to billing charges of a particular billing charge type in the bill timeline such that the visual content items corresponding to billing charges of the particular billing charge type are aligned adjacent to one another in the first dimension and visual content items corresponding to billing charges assessed in a particular billing period of the plurality of billing periods are aligned adjacent to one another in second dimension perpendicular to the first dimension, the billing charges of the particular billing charge type including a first billing charge type and a second billing charge type, the first billing charge type aligned in a first row in the first dimension, the second billing charge type aligned in a second row in the first dimension;

identify at least one interactive visual content item corresponding to a one-time billing charge assessed during the particular billing period;

generate at least one portion of the bill timeline corresponding to the particular billing period for insertion of the at least one interactive visual content item by moving the first billing charge type or the second billing charge type from the first row or the second row, respectively, within the particular billing period to the second row or a third row, respectively, within the particular billing period;

insert, into the at least one portion of the bill timeline, the at least one interactive visual content item;

provide, for display, the visual content items corresponding to the credits in the bill timeline corresponding to the billing period within which the credits were received or applied;

display, on the one or more mobile devices, the bill timeline including the provided visual content items;

receive, from the one or more mobile devices, an online action on an interactive visual content item of the at least one interactive visual content item inserted in the generated bill timeline; and dynamically provide, for display, responsive to the receiving the online action, a supplemental content item including additional details of the billing charge associated with the visual content item on which the online action was received.

7. The system of claim 6, wherein inserting, in the generated bill timeline, the at least one visual content item corresponding to the one-time billing charge assessed during the particular billing period within the at least one portion of the bill timeline corresponding to the billing period includes:

determining a date within the billing period on which the one-time billing charge was assessed or incurred; and inserting the visual content item corresponding to the one-time billing charge within the at least one portion of the bill timeline corresponding to the date within the billing period.

8. The system of claim 6, wherein the processor is further configured to:
- identify a plurality of billing charge types to group together;
- identify billing charges of the identified plurality of billing charge types;
- group together the billing charges of the identified plurality of billing charge types;
- generate a single visual content item corresponding to the identified billing charges grouped together; and
- provide, for display, the generated single visual content item in the bill timeline corresponding to a billing period in which the billing charges that were grouped together were assessed.

9. The system of claim 6, wherein the first dimension is one of a width, length or height of the visual content item and the second dimension is another of the width, length or height of the visual content item.

10. The system of claim 6, wherein the processor is further configured to:
- compute an aggregate of all the billing charges corresponding to each of the plurality of billing periods; and
- provide, for display, a total amount for a bill corresponding to the particular billing period based on the aggregate of all the billing charges corresponding to the particular billing period.

11. A non-transitory computer-readable storage medium having instructions to provide information via a computer network, the instructions comprising instructions to:
- execute a mediation layer in communication with a web presentation layer and one or more billing systems, the web presentation layer configured to receive bill related information from the one or more billing systems via the mediation layer, the mediation layer including one or more integration adapters configured to establish and maintain communications between the web presentation layer and the one or more billing systems, the mediation layer in communication with one or more native applications executing on one or more mobile devices and configured to communicate with the one or more native applications using API service wrappers to provide bill timelines generated for presentation on the one or more mobile devices;
- receive a request to generate a bill timeline including the bill related information for a plurality of bills corresponding to a plurality of billing periods, the request including a plurality of billing charges assessed by a provider to include in the bill timeline;
- determine, from the request, a billing charge type of each of the plurality of billing charges included in the request and a first length of time associated with a billing charge of the plurality of billing charges;
- generate a plurality of visual content items, each of which corresponding to a respective billing charge of the plurality of billing charges and wherein each visual content item of a respective billing charge type having a set of visual characteristics that are different from visual content items of another respective billing charge type, and wherein each visual content item corresponding to a periodic billing charge includes a first dimension and a second dimension, the first dimension having a first dimension size based on a ratio of i) a second length of time in a billing period that the billing charge was assessed and ii) a third length of time of the billing period in which the billing charge was assessed, and the second dimension having a second dimension size based on an amount of the billing charge;
- generate the bill timeline having a plurality of segments, each segment corresponding to a respective billing period, the respective billing period extending from a first end to a second end, the first end positioned at a first position along the billing period corresponding to when the billing charge began for the billing period and the second end positioned at a second position along the billing period corresponding to when the billing charge ended for the billing period;
- generate visual content items corresponding to credits associated with an account for which the bill timeline is generated;
- insert, in the generated bill timeline, the generated visual content items in the plurality of segments within the bill timeline according to a content insertion policy, the content insertion policy including one or more rules to insert visual content items corresponding to billing charges of a particular billing charge type in the bill timeline such that the visual content items corresponding to billing charges of the particular billing charge type are aligned adjacent to one another in the first dimension and visual content items corresponding to billing charges assessed in a particular billing period of the plurality of billing periods are aligned adjacent to one another in the second dimension perpendicular to the first dimension, the billing charges of the particular charge type including a first billing charge type and a second billing charge type, the first billing charge type aligned in a first row in the first dimension, the second billing charge type aligned in a second row in the first dimension;
- identify at least one interactive visual content item corresponding to a one-time billing charge assessed during the particular billing period;
- generate at least one portion of the bill timeline corresponding to the particular billing period for insertion of the at least one interactive visual content item by moving the first billing charge type or the second billing charge type from the first row or the second row, respectively, within the particular billing period to the second row or a third row, respectively, within the particular billing period;
- insert, into the at least one portion of the bill timeline, the at least one interactive visual content item;
- provide, for display, the visual content items corresponding to the credits in the bill timeline corresponding to the billing period within which the credits were received or applied;
- display, on the one or more mobile devices, the bill timeline including the provided visual content items;
- receive, from the one or more mobile devices, an online action on an interactive visual content item of the at least one interactive visual content item inserted in the generated bill timeline; and
- dynamically provide, for display, responsive to the receiving the online action, a supplemental content item including additional details of the billing charge associated with the visual content item on which the online action was received.

* * * * *